(12) United States Patent
Francisco et al.

(10) Patent No.: US 10,367,656 B2
(45) Date of Patent: Jul. 30, 2019

(54) NETWORK TRAFFIC SYSTEM AND METHOD OF OPERATION THEREOF

(71) Applicant: Quantea Corporation, Santa Clara, CA (US)

(72) Inventors: Michael B. Francisco, Hayward, CA (US); Nan Liu, San Jose, CA (US)

(73) Assignee: Quantea Corporation, San Jose, CA (US)

(*) Notice: Subject to any disclaimer, the term of this patent is extended or adjusted under 35 U.S.C. 154(b) by 363 days.

(21) Appl. No.: 15/049,436

(22) Filed: Feb. 22, 2016

(65) Prior Publication Data

US 2016/0248655 A1 Aug. 25, 2016

Related U.S. Application Data

(60) Provisional application No. 62/120,851, filed on Feb. 25, 2015.

(51) Int. Cl.
*H04L 12/46* (2006.01)
*H04L 12/26* (2006.01)
*H04L 12/24* (2006.01)
*H04L 12/741* (2013.01)

(52) U.S. Cl.
CPC ........ *H04L 12/4633* (2013.01); *H04L 43/028* (2013.01); *H04L 43/04* (2013.01); *H04L 43/12* (2013.01); *H04L 41/0823* (2013.01); *H04L 45/745* (2013.01)

(58) Field of Classification Search
CPC ....... H04L 43/028; H04L 43/12; H04L 43/04; H04L 41/0823; H04L 12/4633; H04L 45/745
See application file for complete search history.

(56) References Cited

U.S. PATENT DOCUMENTS

| | | | |
|---|---|---|---|
| 5,648,965 A | 7/1997 | Thadani et al. | |
| 7,269,647 B2 | 9/2007 | Chang et al. | |
| 7,444,515 B2 | 10/2008 | Dharmapurikar et al. | |
| 8,171,553 B2 | 5/2012 | Aziz et al. | |
| 8,194,552 B1* | 6/2012 | Ye | H04L 43/50 370/235 |
| 9,210,090 B1* | 12/2015 | Baldi | H04L 47/2441 |
| 2002/0095513 A1* | 7/2002 | Lin | H04L 69/04 709/238 |
| 2003/0135612 A1* | 7/2003 | Huntington | H04L 41/0803 709/224 |
| 2007/0011321 A1* | 1/2007 | Huntington | H04L 43/028 709/224 |
| 2010/0290364 A1 | 11/2010 | Black | |
| 2010/0325263 A1* | 12/2010 | Raja | H04L 43/04 709/224 |

(Continued)

*Primary Examiner* — Habte Mered
(74) *Attorney, Agent, or Firm* — Wong & Rees LLP

(57) ABSTRACT

A system and method of operation of a network traffic system includes: a first portion of network traffic gathered from an external network; a first network filter for selecting a first network packet from the first portion of the network traffic; a first capture file for storing the first network packet; a second network packet selected from a second network filter; a second capture file for storing the second network packet concurrently with the compression of the first capture file; and a display device for displaying the first compressed capture file using a search value.

20 Claims, 18 Drawing Sheets

(56) References Cited

U.S. PATENT DOCUMENTS

| | | | | |
|---|---|---|---|---|
| 2012/0047492 A1* | 2/2012 | Huang | G06F 11/3672 | 717/128 |
| 2012/0084605 A1* | 4/2012 | Shilon | H04L 43/12 | 714/33 |
| 2012/0185427 A1* | 7/2012 | Fontignie | G06F 11/1435 | 707/609 |
| 2012/0230186 A1* | 9/2012 | Lee | H04L 43/028 | 370/230 |
| 2012/0254366 A1* | 10/2012 | Kusterer | H04L 43/04 | 709/219 |
| 2014/0115712 A1* | 4/2014 | Powell | G06F 21/6263 | 726/26 |
| 2014/0172868 A1* | 6/2014 | Lin | G06F 17/30545 | 707/741 |
| 2014/0280737 A1* | 9/2014 | Bicket | H04L 67/02 | 709/218 |
| 2014/0355613 A1* | 12/2014 | Pope | H04L 49/20 | 370/392 |
| 2015/0078288 A1* | 3/2015 | Sanyal | H04W 8/02 | 370/329 |
| 2015/0135325 A1* | 5/2015 | Stevens | H04L 63/1416 | 726/25 |
| 2016/0065448 A1* | 3/2016 | Loveless | G09C 1/00 | 370/218 |
| 2016/0094418 A1* | 3/2016 | Raney | H04L 43/028 | 370/241 |
| 2016/0127218 A1* | 5/2016 | Maloo | H04L 43/028 | 370/390 |
| 2017/0161377 A1* | 6/2017 | Cartwright | H04L 43/04 | |

* cited by examiner

NETWORK TRAFFIC SYSTEM AND METHOD OF OPERATION THEREOF

CROSS-REFERENCE TO RELATED APPLICATION(S)

This application claims the benefit of U.S. Provisional Patent Application Ser. No. 62/120,851 filed Feb. 25, 2015, and the subject matter thereof is incorporated herein by reference thereto.

TECHNICAL FIELD

The present invention relates generally to data storage, networking and data analysis, and more particularly to network systems to capture, store, and analyze network traffic.

BACKGROUND ART

The development of modern networking systems requires the processing of large amounts of network traffic data. Properly functioning network systems such as routers, switches, processors, buffers, transmitters, receivers, and other high capacity devices are essential for operating the Internet.

The volume and speed of network traffic increases as the Internet expands with the growth and addition of new services such as high quality video, movies and television on demand, high speed communication services, security monitoring, and other data intensive products. In addition, security threats such as organized hacking, distributed denial of service attacks (DDoS), spoofing, and wholesale identity theft show the need for new and innovating ways provide managed data systems on the Internet.

In view of the need for the effective use of information due to the increase in Internet traffic, it is increasingly critical that answers be found to these problems. In view of the ever-increasing commercial competitive pressures, along with growing expectations of the populace, it is critical that answers be found for these problems. Additionally, the need to reduce costs, improve efficiencies and performance, and meet critical time pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a network traffic system that includes: gathering a first portion of network traffic from an external network; selecting a first network packet through a first network filter; storing the first network packet into a first capture file; selecting a second network packet through a second network filter; compressing the first capture file while concurrently storing the second network packet in a second capture file; searching the first compressed capture file and the second capture file using a search value for displaying on a display device.

The present invention provides network traffic system that includes: a first portion of network traffic gathered from an external network; a first network filter for selecting a first network packet from the first portion of the network traffic; a first capture file for storing the first network packet; a second network packet selected from a second network filter; a second capture file for storing the second network packet concurrently with the compression of the first capture file; and a display device for displaying the first compressed capture file using a search value.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
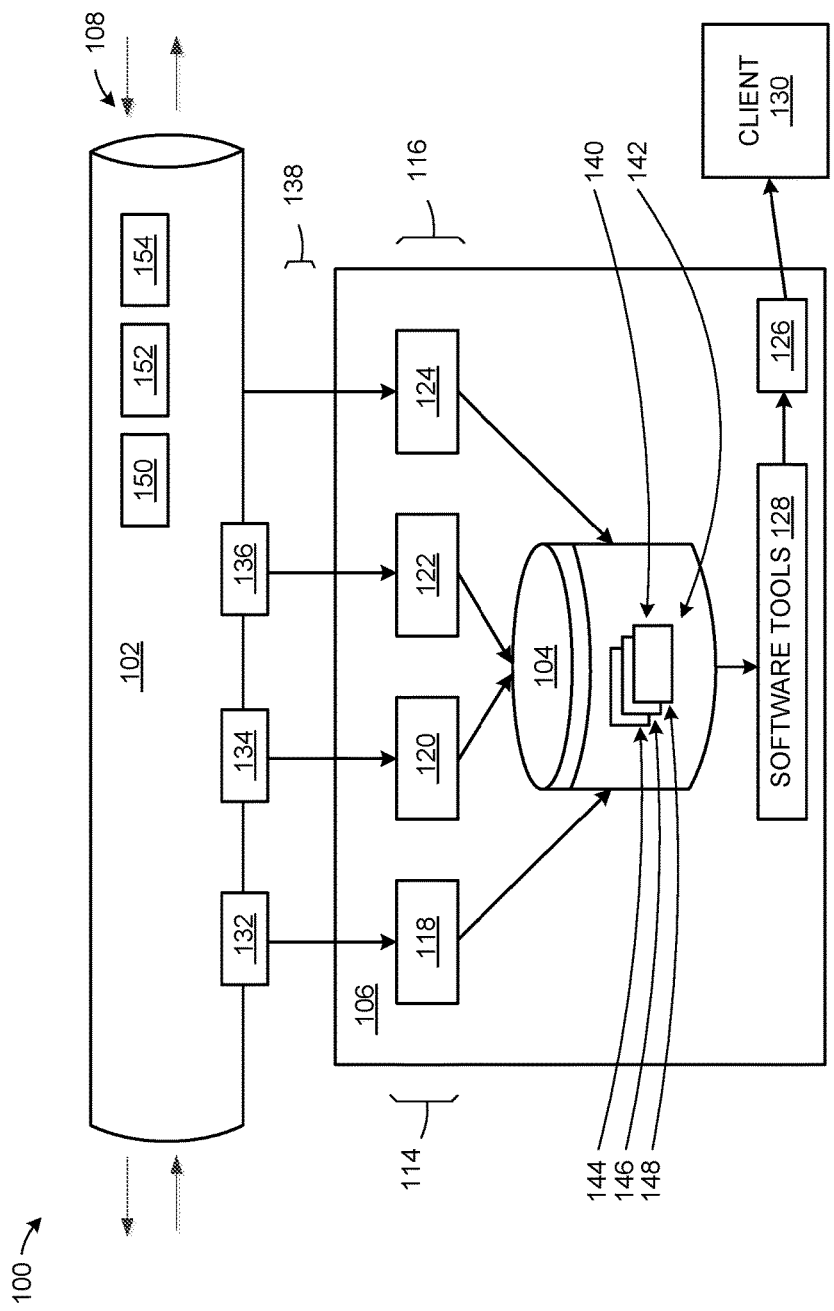
FIG. 1 is an exemplary diagram of network traffic system in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features will be described with the same or similar reference numerals.

For expository purposes, the term "horizontal" as used herein is defined as a plane parallel to the plane or surface of the surface of the earth, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane, as shown in the figures.

Referring now to FIG. 1, therein is shown an exemplary diagram of network traffic system 100 in a first embodiment of the present invention. The network traffic system 100 can manage network traffic 108.

The network traffic system 100 can include a packet analyzer 106. The packet analyzer 106 is a device for gathering, storing, compressing, analyzing, and replaying the network traffic 108.

The network traffic system 100 can include network interfaces 114 coupled to an external network 102 to capture network traffic 108. As the network traffic 108 is captured, it can be stored in storage units 104 in discrete data chunks. The data chunks of the network traffic 108 can be analyzed by analytic software tools 128 and the results of the analysis can be sent via an external interface 126 to a client 130 for further processing.

The external network 102 can have a variety of configurations. For example, the external network can be a wide area network (WAN), a local area network (LAN), a network backbone, a trunk line, a microwave link, a network link, or a combination thereof. In an illustrative example, the external network 102 can be a high speed communication link connecting a corporate network to an Internet backbone.

The network traffic system 100 can include one or more of the network interfaces 114 for the capture and generation of the network traffic 108 to and from the external network 102. The network interfaces 114 can capture the network traffic 108 as packet capture data 142 (PCAP data).

The network traffic 108 can be stored in a set of capture files 140 each holding a portion of the network traffic 108. The capture files 140 are data files for storing information in the storage units 104. For example, the capture files 140 can include a first capture file 144, a second capture file 146, a third capture file 148, or additional enumerated files.

The network traffic system 100 can include settings for controlling the configuration of the capture files 140. The format setting can control the packet capture format version and the time stamp resolution for the packets. The time stamp setting can range from microseconds to nanoseconds. The interval setting can control the interval cutoff between changing the capture files 140. The increment file setting can control the cutoff period by either size or packet basis.

The network traffic 108 can consist of one or more network packets 138. The network packets 138 are units of data for carrying information on the external network 102. The network traffic 108 can include a first network packet 150, a second network packet 152, a third network packet 154, or additional enumerated packets.

The network interfaces 114 are devices for connecting to the external network 102. The network interfaces 114 can have a variety of configurations. The network traffic system 100 can have the network interfaces 114 having one or more network ports 116. For example, the network ports 116 can include a port-0 118, a port-1 120, a port-2 122, and a port-3 124. Although the network traffic system 100 is shown as having four ports, it is understood that the system can have a variety of configuration and may include any number of the network interfaces 114 and network ports 116.

The network interfaces 114 can access the network traffic 108 on the external network 102 in a variety of ways. For example, the network interfaces 114 can be coupled to the external network 102 using a test access point 132 (TAP), a switch port analyzer (SPAN), a network packet broker 136 (NPB), or a similar component. The TAP 132 is a passive splitting mechanism installed between the network interfaces 114 and the external network 102. The TAP 132 can send and receive data streams simultaneously on different dedicated channels. The SPAN 134, also known as a mirror port, is an analysis device attached to a network cable to access the network traffic 108. The network packet broker 136 is a device for gathering and aggregating the network traffic 108. The network packet broker 136 can gather the network traffic 108 from SPAN ports, TAPs, or other traffic sources.

The storage units 104 are high performance data storage device such as a disk drive, a disk array, a solid state drive, an optical drive, or a combination thereof. Although the storage units 104 are shown as a single logical unit, it is understood that the storage units 104 can have a variety of configurations. For example, the storage units 104 can include multiple data storage devices, hierarchical data storage devices, distributed data storage devices, or a combination thereof.

The analytic software tools 128 are computer software programs designed to process the network traffic 108. Typically, the software tools can generate status reports, summary, or detect conditions within the network traffic 108. Although the analytic software tools 128 are shown as a standalone element, it is understood that the analytic software tools 128 can execute on the processor unit of the network traffic system 100.

The network traffic system 100 can include the external interface 126. The external interface 126 is a communication device for transferring information to the client 130. The client 130 is an external data consumer, such as an external reporting or display system.

Figure 2:
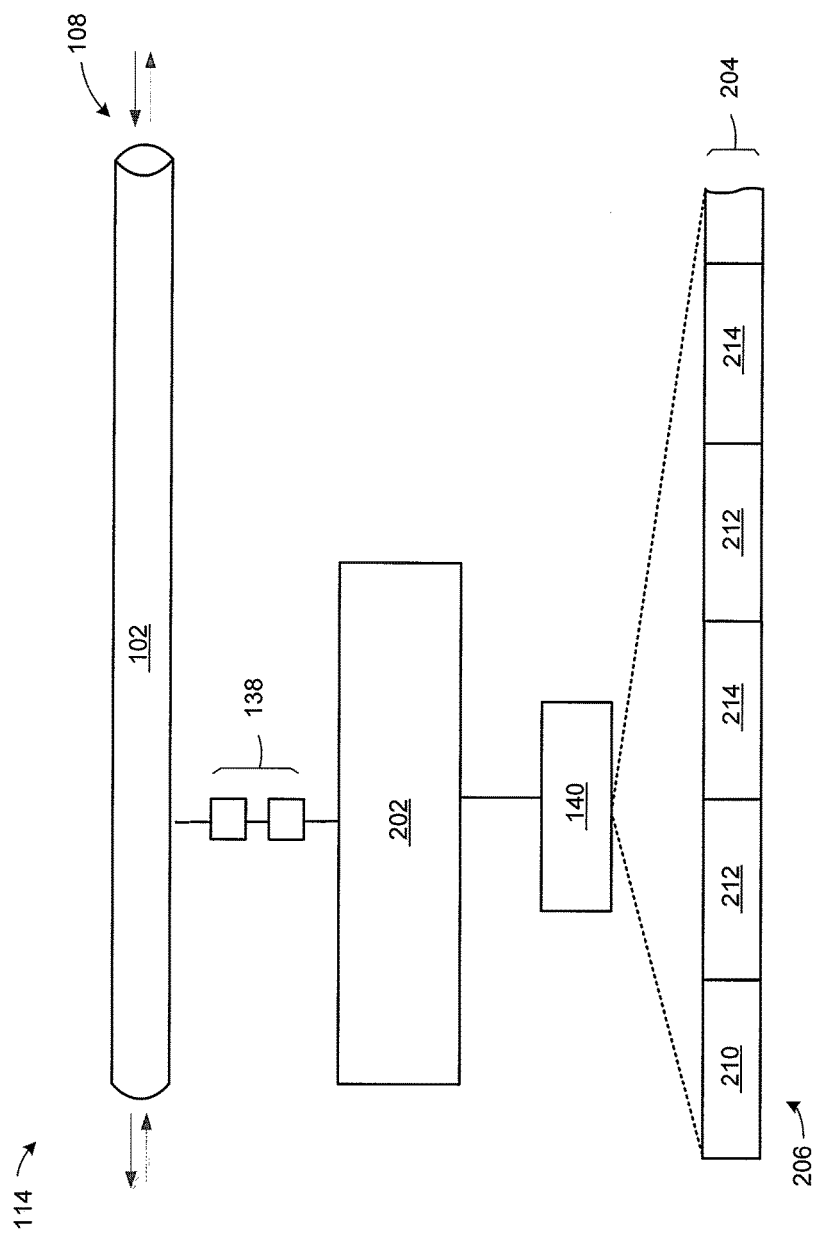
FIG. 2 is an example of a network interface.

Referring now to FIG. 2, therein is shown an example of a network interface 114. The network interface 114 can gather the network traffic 108 from the external network 102 and store the network packets 138 in the capture files 140.

The network interface 114 can have a variety of configurations. For example, the network interface 114 can include a network interface card 202 having a field programmable gate array (FPGA) processor, half a gigabyte of memory, quartz oscillator timer, and support the XFP-compatible interfaces. XFP is the designator for a 10 gigabit small form factor pluggable network transceivers. For example, the network interface card 202 can support configuration with 4×1 gigabit per second (Gbps), 2×10 Gbps, or other similar configuration.

The packet capture protocol defines a PCAP file format 204 and layout of the capture files 140 for PCAP data 206. The PCAP file format 204 has a global header 210 followed by zero or more records for each captured one of the network packets 138 from the external network. Each captured packet can have a packet header 212 and packet data 214. Although the protocol has been described as PCAP, it is understood that this also includes related protocols including PCAPng and other configurations.

The global header 210 can having a structure including values such as a magic number; a major version number, a minor version number, the time and time zone offset information, the significant figures for accuracy of the timestamps, the maximum length of captured packets, the network and data link type, or a combination thereof. The magic number is an enumerated file signature value.

The packet header 212 can include a timestamp in seconds and microsecond, packet length, and default packet length information. The packet data 214 can include a data blob representing the data in the network packets 138.

It has been discovered that gathering and saving the network traffic 108 in the PCAP file format 204 in the capture files 140 increases flexibility and interoperability. Storing the network traffic 108 in a plurality of serially identified instances of the capture files 140 allows higher file bandwidth.

Figure 3:
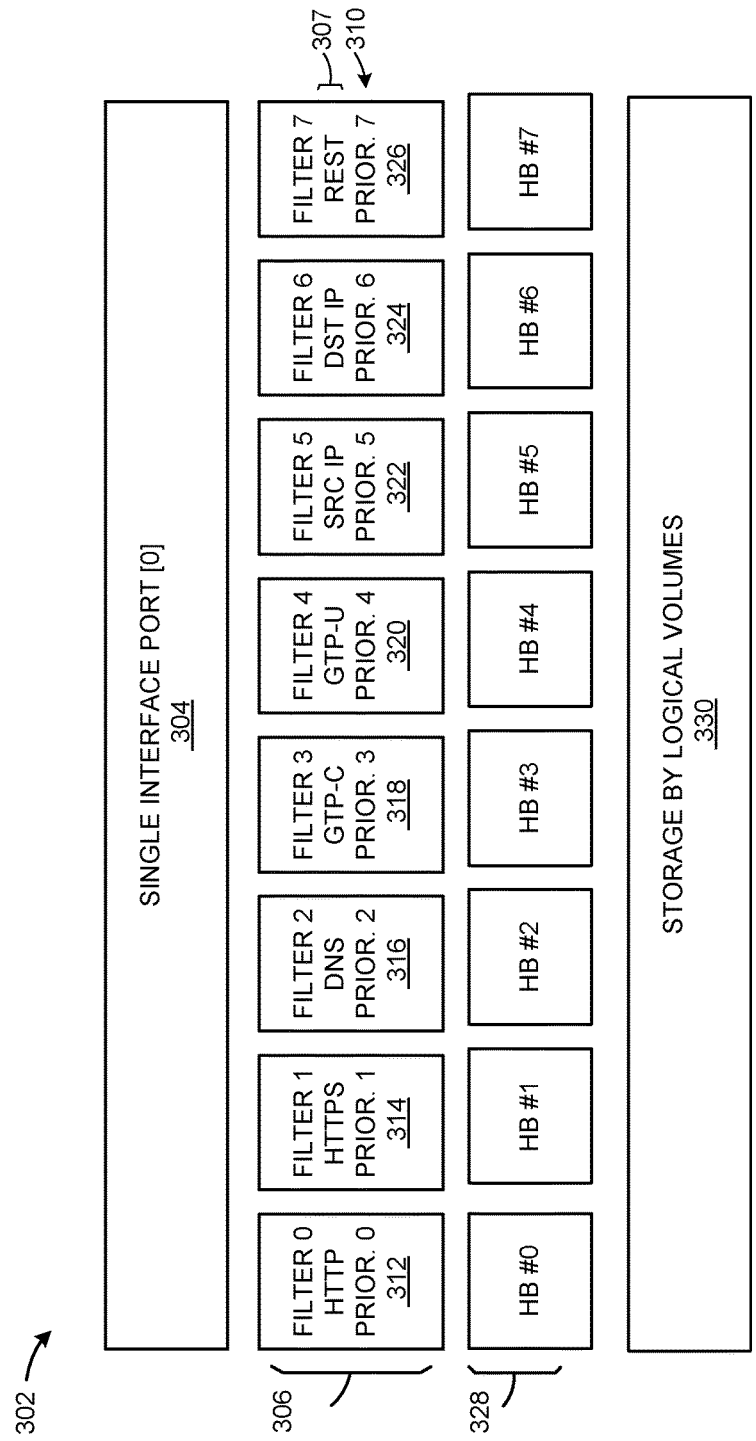
FIG. 3 is an example of a network interface configuration.

Referring now to FIG. 3, therein is shown an example of a network interface configuration 302. The network interface configuration 302 can include a single interface port 304 coupled to the storage units 104 of FIG. 1 via the network filters 306.

The network filters 306 are modules for receiving and processing particular types of the network traffic 108. The modules can be implemented in a hardware, software, or a combination thereof. For example, the network filters 306 can be configured to process the network traffic 108 based on a network protocol 307 used. Each of the network filters 306 can have a filter priority 310. The filter priority 310 allows the network interface 114 of FIG. 1 to order the usage of the network filters 306 based on the filter priority 310. For example, one of the network filters 306 with higher priority will be processed before one with a lower priority. The lower priority values have a higher priority.

The network filters 306 can be configured in a variety of ways. For example, one of the network filters 306 can be configured with a filter number, a port number, a source IP address, a destination IP address, and a filter priority. For overlapping filters within the same port, the filter priority, ranging from 0-64, controls which filter can filter a particular packet. The network filter 306 with the highest priority can filter the packet, where 0 is the highest priority and 64 is the lowest.

In an illustrative example, the network interface configuration 302 can include eight processing threads each managing a single filter. The network filters 306 can be configured to filter traffic based on the network protocol. The system can implement multiple protocols using a logical OR configuration to filter each of the protocols.

A filter-0 312 can be configured to process hypertext transfer protocol data (HTTP). The filter-0 312 thread can have the filter priority 310 of 0.

A filter-1 314 can be configured to process hypertext transfer protocol secure data (HTTPS). The filter-1 314 thread can have the filter priority 310 of 1.

A filter-2 316 can be configured to process domain name server data (DNS) data. The filter-2 316 thread can have the filter priority 310 of 2.

A filter-3 318 can be configured to process GPRS Tunneling Protocol-Control Plane (GTP-C) data. The filter-3 318 thread can have the filter priority 310 of 3. The General Packet Radio Service (GPRS) is a packet orientated mobile data service of 2G ($2^{nd}$ generation) and 3G ($3^{rd}$ generation) cellular communication systems.

The GPRS tunneling protocol is a group of IP-based communications protocols used to carry GPRS (General Packet Radio Service) data with GSM (Global System for Mobile communications), UMTS (Universal Mobile Telecommunication Service), and LTE (Long Term Evolution) networks. GTP is the main protocol used by the GPRS core network to allow 2G, 3G, and WCDMA mobile networks to transmit IP packets to external networks.

A filter-4 320 can be configured to process GPRS Tunneling Protocol-User plane (GTP-U) data. The filter-4 320 thread can have the filter priority 310 of 4. The GTP-U data can be used for the transfer of user data in separated tunnels for each Packet Data Protocol (PDP) context.

A filter-5 322 can be configured to process based on the source IP address (SRC-IP). The filter-5 322 thread can have the filter priority 310 of 5.

A filter-6 324 can be configured to process based on destination IP address data (DST-IP). The filter-6 324 thread can have the filter priority 310 of 6.

A filter-7 326 can be configured to process packets that do not meet the criteria of the other filters. The filter-7 326 thread can have the filter priority 310 of 7.

Each of the network filters 306 can include host buffers 328, such as HB0, HB1, HB2, HB3, HB4, HB5, HB6, and HB7. The host buffers 328 can be used to manage the flow of the data traffic between the network filters 306 and logical storage volumes 330. The logical storage volumes 330 can provide redundant access to disks, disk arrays, hybrid storage units, solid state drives, optical storage, or a combination thereof.

Figure 4:
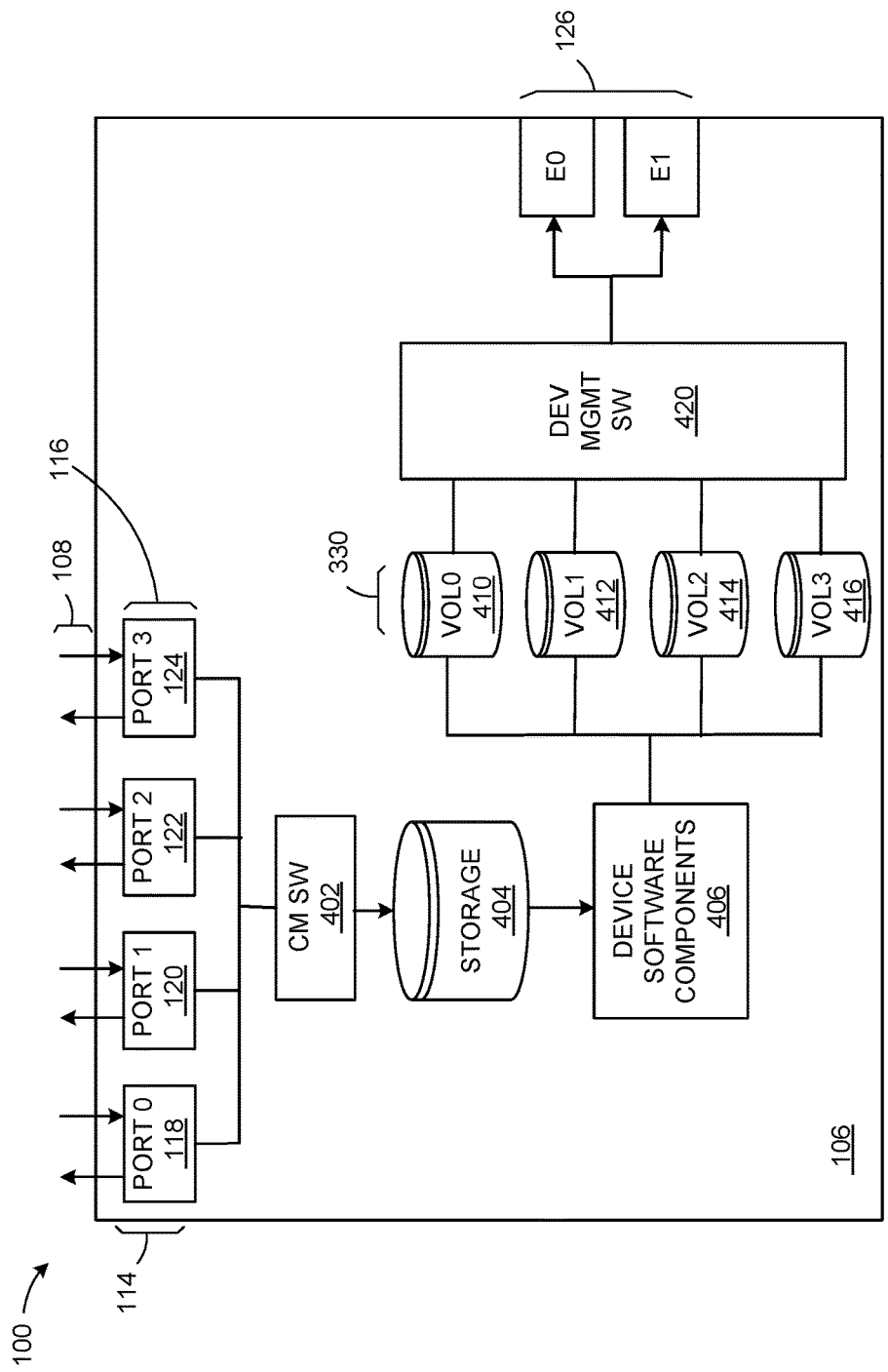
FIG. 4 is a second example of network traffic system.

Referring now to FIG. 4, therein is shown a second example of the network traffic system 100. The network traffic system 100 can gather, store, analyze, and generate computer network traffic 108. The network traffic system 100 can include the packet analyzer 106.

The network traffic system 100 can include the network interfaces 114 coupled to the external network 102 of FIG. 1 to capture network traffic 108. As the network traffic 108 is captured, it can be stored in the storage system 404. The data chunks of the network traffic 108 can be analyzed by the analytic software tools 128 of FIG. 1 and the results of the analysis can be sent via the external interface 126 to the client 130 of FIG. 1 for further processing.

The network interfaces 114 are devices for connecting to an external network 102. The network interfaces 114 can gather and generate the network traffic 108.

The network interfaces 114 can have a variety of configurations. The network traffic system 100 can have the network interfaces 114 having multiple network ports 116 as the port-0 118, the port-1 120, the port-2 122, and the port-3 124. Although the network traffic system 100 is shown as having four ports, it is understood that the system can have a variety of configuration and may include any number of the network interfaces 114 and network ports 116.

The network interfaces 114 can be managed by capture management software 402. The capture management software 402 can configure the network interfaces 114 and perform load balancing as necessary to gather the network traffic 108. The capture management software 402 can store the network traffic 108 in the capture files 140 of FIG. 1 in the storage system 404.

The capture files 140 are data files for holding a portion of the network traffic 108 gathered by the network interfaces 114 and the capture management software 402. The network traffic system 100 can create the capture files 140 in a variety of ways. For example, the capture files 140 can be created on a per filter basis, a per port basis, based on time, based on protocol, or a combination thereof.

The capture management software 402 can include software tools designed to enhance the capability of the network traffic system 100 to gather the network traffic 108. The capture management software 402 can include tools such as packet search, independent capturing, independent filtering, capture file compression, and other components. In an illustrative example, the capture management software 402 can include different mode settings to improve capture performance. This can include a discard mode for discarding some of the network packets 138 before writing to disk, such as unwanted or unmatched packets.

The storage system 404 is a high performance logical data storage system. The storage system 404 can be managed by device software components 406 which can create and manage logical storage volumes 330 of FIG. 3, such as a volume-0 410, a volume-1 412, a volume-2 414, and a volume-3 416. Although the network traffic system 100 is shown as having four of the logical storage volumes 330, it is understood that the system can have a variety of configurations and may include any number of the logical storage volumes 330.

Each of the logical storage volumes 330 can store traffic coming from one of the network ports 116. For example, the volume-0 410 can be configured to store the capture files 140 for the network traffic 108 captured from the port-0 118.

The logical storage volumes 330 can be managed using a device management software 420 which can intelligently present the network traffic 108 in the capture files 140 to the external interface 126, such as E0 and E1.

Figure 5:
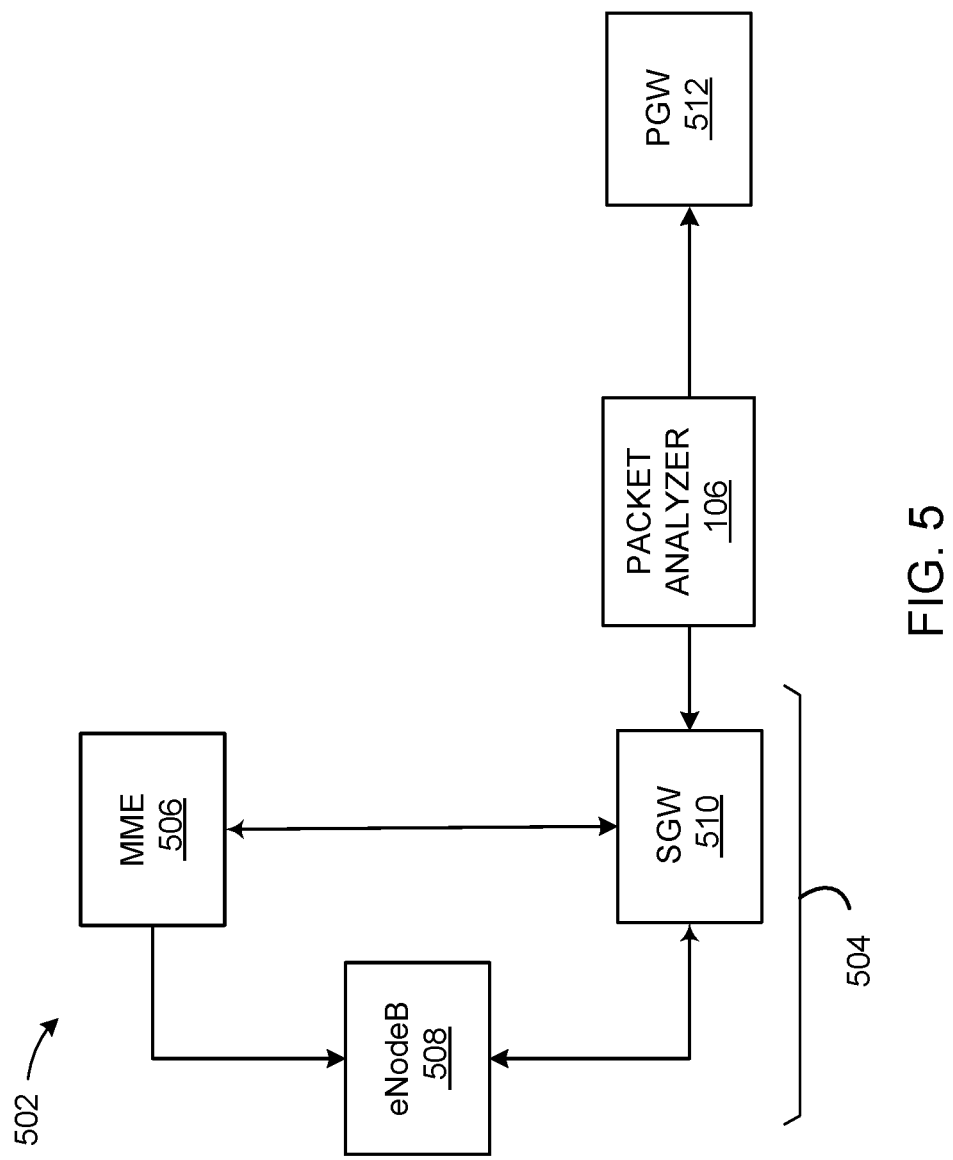
FIG. 5 is an example of the packet analyzer in a core carrier network.

Referring now to FIG. 5, therein is shown an example of the packet analyzer 106 in a core carrier network 502. The packet analyzer 106 can be used to monitor the network traffic 108 of FIG. 1 in a long term evolution core network 504 (LTE core network) of a carrier or major network service provider.

The core carrier network 502 can include a mobility management entity 506 (MME). The MME 506 can manage network session states, authentication, paging, mobility with other system, roaming, and other bearer management functions.

The core carrier network 502 can include an evolved NodeB 508 (eNodeB). The eNodeB 508 is a hardware element for communicating directly with mobile handsets in a GSM network. The eNodeB 508 can interface with the MME 506 for control plane traffic.

The core carrier network 502 can include a servicing gateway 510 (SGW). The SGW 510 is a data plane element for managing user plane mobility and maintaining data paths between the eNodeB 508 for managing user plane traffic.

The packet analyzer 106 can be between the SGW 510 of the core carrier network 502 and a packet data network gateway 512 (PDN Gateway, PGW). The SGW 510 can manage the user-plane mobility and demarcates between a radio access network and the core network. The SGW maintains data paths between the eNodeB 508 and the PGW 512. The SGW 510 can act as a termination point of a packet data network at the PGW 512.

The packet analyzer 106 can monitor the network traffic 108 between the SGW 510 and the PGW 512. This allows the packet analyzer 106 to gather the network traffic 108 from the core network to the external physical networks.

Figure 6:
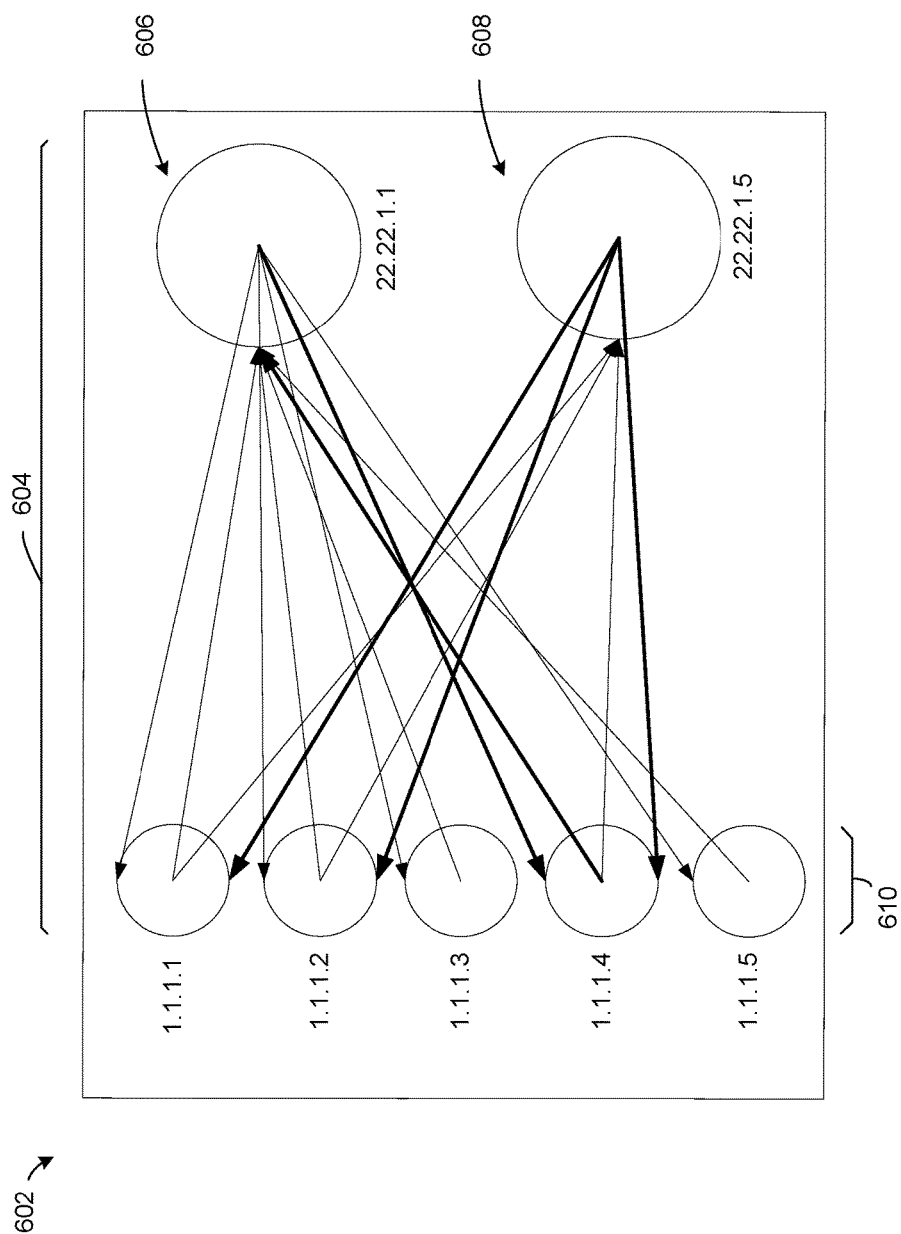
FIG. 6 is an example of traffic on a multiple node network

Referring now to FIG. 6, therein is shown an example of traffic on a multiple node network 604. Network nodes 602 on the multiple node network 604 can have the network traffic 108 of FIG. 1 flowing between specific nodes. The dotted lines can represent the network traffic 108 flowing to and from a first node 606 (22.22.1.1). The dashed lines can represent the network traffic 108 flowing to and from a second node 608 (22.22.1.5). The network traffic 108 can pass between the first node 606, the second node 608, and client nodes 610.

The solid lines represent the network traffic 108 captured by the network traffic system 100 of FIG. 1. The network traffic 108 can be captured using independent filtering. In independent filtering, each port implements a single filter.

Figure 7:
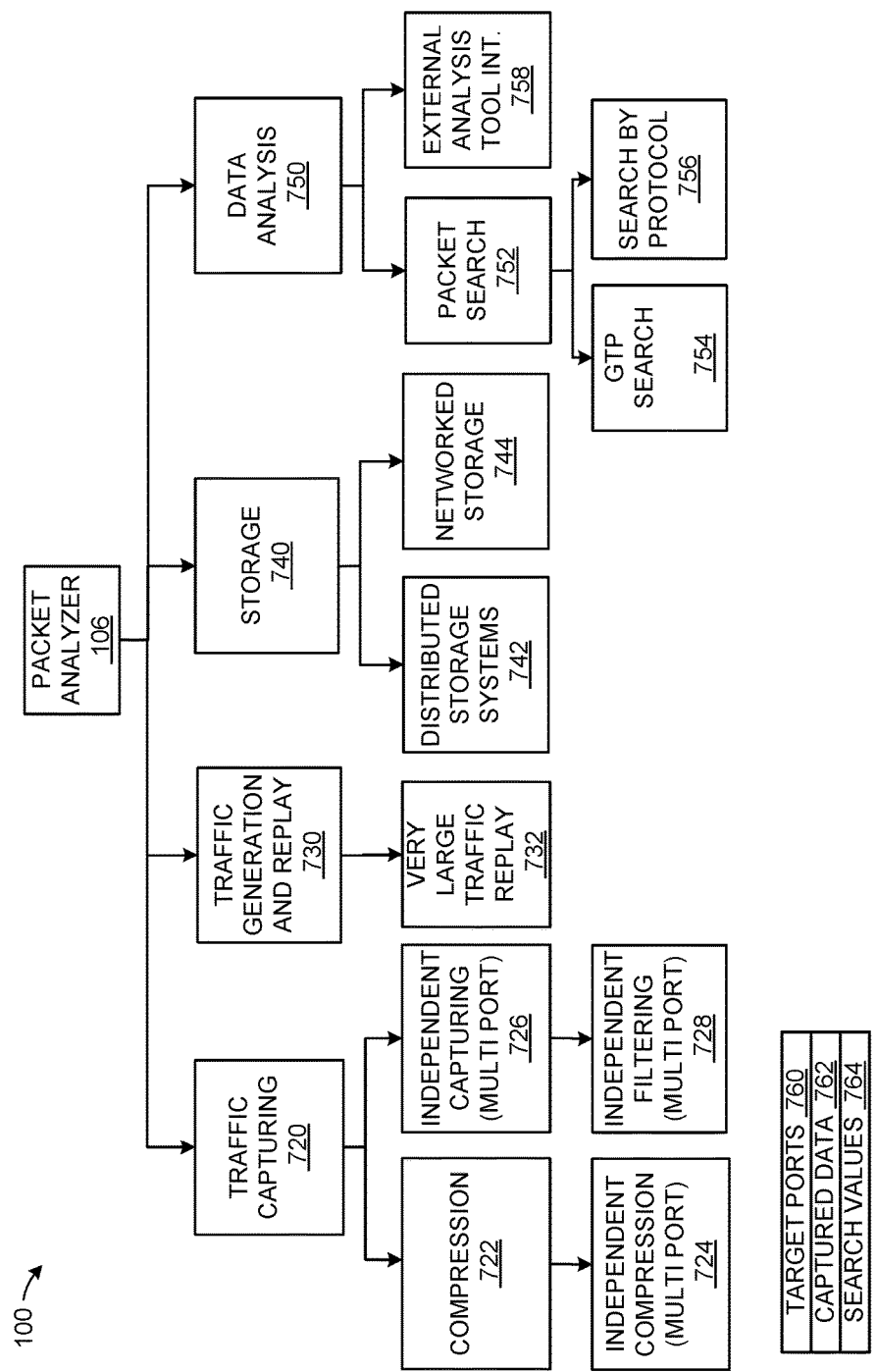
FIG. 7 is an example of a third example of the packet analyzer.

Referring now to FIG. 7, therein is shown a third example of the packet analyzer 106. The packet analyzer 106 can perform a variety of functions including traffic capture, traffic generation and replay, data storage, and data analysis.

The network traffic system 100 can include a variety of functional modules. For example, the network traffic system 100 can include a traffic capturing module 720, a traffic generation and replay module 730, a storage module 740, and a data analysis module 750.

The traffic capturing module 720 can gather, compress, and store the network traffic 108 of FIG. 1. The traffic capturing module 720 can include a compression module 722 and an independent capturing module 726.

The compression module 722 can receive the network traffic 108 gathered from the external network 102 of FIG. 1 and store the data in the capture files 140 of FIG. 1. The compression module 722 can perform compression on the capture files 140.

The compression module 722 can support an independent compression multiport module 724. The independent compression multiport module 724 can implement the compression for each of the network ports 116 of FIG. 1.

The independent capturing module 726 can implement multiport capturing by capturing the network traffic for each of the network ports 116. The independent capturing module 726 can be linked to an independent filtering module 728. The independent filtering module 728 can implement a multiport filtering process.

The traffic generation and replay module 730 can retrieve captured data 762 in the capture files 140 and replay the network traffic 108 on a target port 760. The traffic generation and replay module 730 can generate the network traffic 108 on a different one of the network ports 116 than was used to gather the network traffic 108. In an illustrative example, the traffic generation and replay module 730 can replay the capture files 140 having a total size of more than 5 GB. The traffic generation and replay module 730 can provide stateful generation and replay of the network traffic 108. Providing stateful generation of the network traffic 108 can support the simulation of establishing sessions and other contextual situations. Stateful generation is the replay of the network traffic 108 with state parameters to provide a specific context.

The traffic generation and replay module 730 can be linked to a very large traffic replay module 732. The very large traffic replay module 732 allows the replay of a large number of the capture files 140 to replicate an extended period of the network traffic 108. For example, the very large traffic replay module 732 can replay more than a terabyte of stored data.

Very traffic replay can be defined as being able to handle sets of data greater than 60 GB and can be as much as the all the data stored in the system. The total of all the data stored in the system can range up to hundreds of terabytes to petabytes. Very large traffic replay can be performed by bypassing the in-memory buffer and reading directly from the storage.

The very large traffic replay module 732 can generate and replay the network traffic 108 by reading the PCAP data directly from the capture files 140. The device drivers for the storage units are configured to sustain full replay speeds directly from the storage units.

In an illustrative example, the very large replay module 732 can include sufficient parallel file reading capacity to generate and replay the network traffic 108 at full network speed. In another example, the network traffic 108 can be generated and replayed on one or more of the network ports 116 to support the required bandwidth.

The storage module 740 can support high performances storage of the network traffic 108. The network traffic system 100 can store data at rates of more than 20 gigabytes per second (GB/s) for small frames and 25-26 GB/s for large frames. For example, the frame size can range from 64 bytes to Jumbo frames.

The storage module 740 can have a variety of configuration. For example, the storage module 740 can utilize a distributed storage systems module 742 and a networked storage system module 744. The distributed storage systems module 742 can include storage devices such as RAID storage units, clustered storage, peer data stores, or a combination thereof. The networked storage system module 744 can includes storage devices attached across a network interface such as a storage area network, network attached storage, cloud storage, file servers, or a combination thereof.

Networked storage is the way storage is mounted to clients through the network. Instead of mounting the storage locally through SATA or PCI interfaces, networked storage goes through a wired/wireless Ethernet connection. Networked storage can go through standard protocols such as NFS (Networked File System), CIFS (Common Internet File System) and iSCSI (Internet Small Computer Systems Interface).

Distributed storage works with multiple storage systems in order to achieve high performance, scalability and redundancy. Distributed storage communicates across its network to share storage capabilities in a cluster. A cluster is a group of interconnected servers that work in a common function; in this case it is storage. One example of Distributed Storage is HDFS (Hadoop Distributed File System).

Networked and Distributed storage are not completely separate. A distributed storage system implementation can have networked storage capabilities.

The data analysis module 750 can support a packet search module 752 and an external analysis tool integration module 758. The data analysis module 750 can process the network traffic 108 stored in the storage module 740 and generate reports as needed.

The packet search module 752 can search the capture files 140 and retrieve packet records based on search values 764. The packet search module can have a variety of configurations. For example, the packet search module 752 can include a GPRS tunneling protocol search module 754 (GTP search module) and a search by protocol module 756.

The GTP search module 754 can search the GTP-related packets in the capture files 140 to identify the GTP traffic based on a mobile subscriber number to identify a mobile device.

The protocol search can search for packets that match the requested protocol. The protocol search will stop analysis as soon as a match is identified. The GTP search goes beyond protocol search. As soon as the search program classifies a GTP packet, the GTP search will go in deeper into the protocol to find information elements (IE) such as TED (tunnel endpoint identifier/identification) and MSISDN (Mobile Station International Sub scriber Directory Number).

The GTP search module 754 can search the PCAP data in the capture files 140 for one of the GTP packets. Once the GTP packet has been identified, the GTP search module 754 can perform a hierarchical search for fields within the GTP packet. The hierarchical search can be performed to search on non-uniform data patterns within the network traffic 108 captured in the capture files 140. The GTP search module 754 can improve performance by conducting the search in parallel using multiple threads, multiple processes, multiple processors, or a combination thereof.

The search by protocol module 756 can search the capture files 140 by the protocol of the network traffic 108. The search by protocol module 756 can have a variety of configurations. For example, the search by protocol module 756 can search using HTTP, HTTPS, DNS, IGMP Internet Group Management Protocol), ICMP (Internet Control Message Protocol), SNMP (Simple Network Management Protocol), or other similar protocols.

The external analysis tool integration module 758 can provide access to internal and external analysis tools for processing the capture files 140. The external analysis tool integration module 758 can provide post process analysis of the capture files 140.

Specific analysis tools are external tools that can have direct access to the traffic data through networked storage. External tools can be third party software such as Wireshark, Riverbed Cascade, and software that analyzes network traffic; and hardware such as IPS/IDC (Intrusion Detection/Prevention Systems) and next generation firewalls (NGFW).

Figure 8:
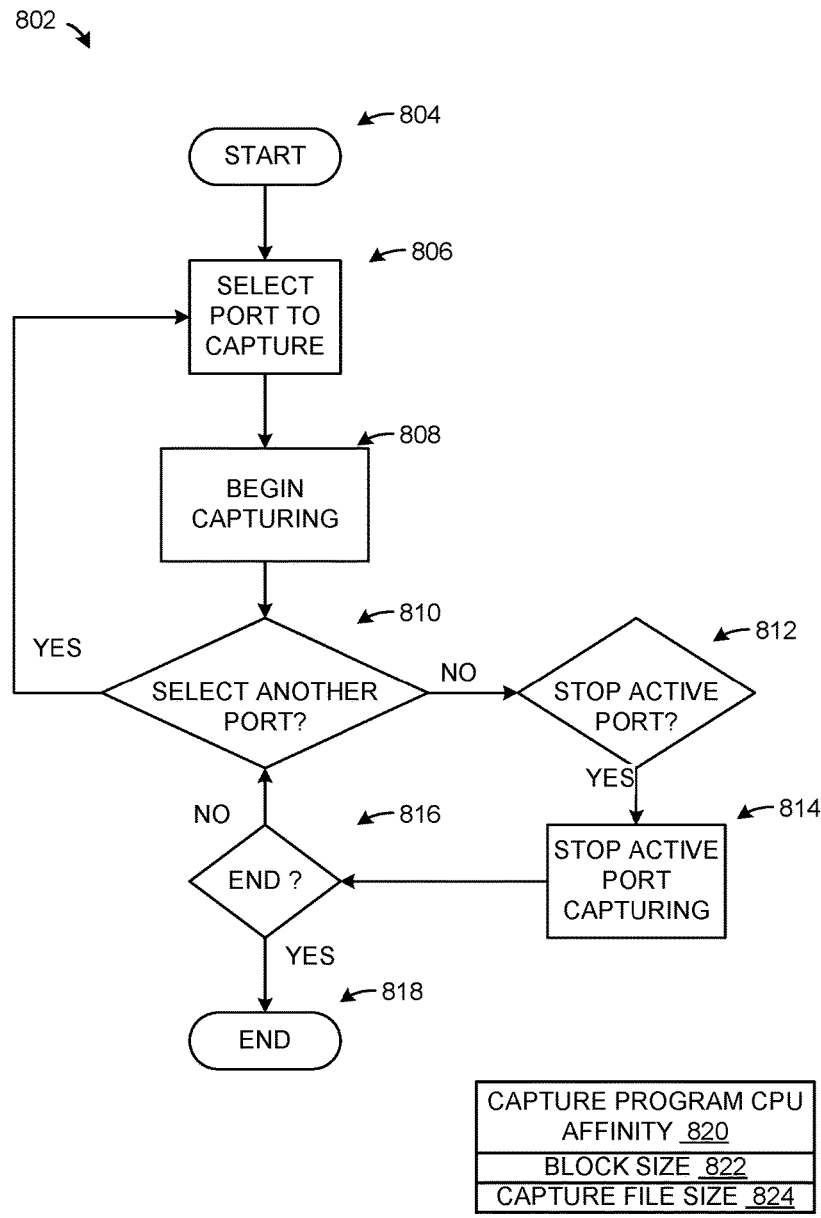
FIG. 8 is an exemplary flowchart of an independent port capture process.

Referring now to FIG. 8, therein is shown an exemplary flowchart of an independent port capture process 802. The independent port capture process 802 can individually identify which of the network ports 116 of FIG. 1 to use to capture the network traffic 108 of FIG. 1.

The independent port capture process 802 can start at a capture start step 804. The independent port capture process 802 can include a capture select port step 806 to select the network ports 116 to use for capturing the network traffic 108. After one of the network ports 116 has been selected, the network traffic 108 can start to be captured in a capture begin capturing step 808.

A capture check select another step 810 includes a decision point to select another of the network ports 116 to use to capture the network traffic 108. If another one of the network ports 116 is selected, then the control flow is pass the capture select port step 806. If another one of the network ports 116 is not selected, then the control flow passes to a capture check stop port step 812.

The capture check stop port step 812 is used to determine if the capture of the network traffic 108 on the currently active port should be stopped. If the capture on the active port is stopped, then the control flow passes to a capture stop port step 814. In the capture stop port step 814, the capture of the network traffic 108 on the currently active port is stopped. The capture stop port step 814 can stop active port capturing.

In a capture check end step 816, the decision to end the independent port capture is made. If the process is not at the end, then the control flow passes to the capture check select another step 810 to determine if another one of the network ports 116 should be selected. If the process is at the end, then the process can terminate in a capture end step 818.

The independent port capture process 802 can include multiple process threads to manage performance to insure the gathering of the network traffic 108. Each of the process threads can stream a portion of the network traffic 108 to a separate one of the capture files 140 to maximize performance and prevent bottlenecks.

The independent port capture process 802 allows each of the network interfaces 114 of FIG. 1 to capture the network traffic 108 without any dependency on another one of the network interfaces 114. Each independent one of the network interfaces 114 can be stop, started, and reconfigured without interfering with the operation of any other one of the network interfaces 114.

It has been discovered that the independent port capture process 802 provides increased flexibility by allow each of the network ports 116 and network interfaces 114 to operate independently. The ability to change the parameters of the network filters 306 of FIG. 3 associated with the network interfaces 114 allows dynamic data collection without system interruption or reset.

The capture program flushes all the packet information on to the storage devices directly without using the memory as a buffer. When the storage devices cannot catch up writing all the network traffic data, instead of dropping those packets, those packets are written to memory instead to prevent packet drops. When the packets in memory are written to the drives, garbage collection (to reclaim free memory) takes place to make room just in case more data is needed to be stored in memory to prevent further packet drops.

It has been discovered that writing packet information directly to the storage devices without memory buffering and only using memory to prevent packet loss improves the technology and performance of the system. By reducing the likelihood of packet loss, the system provides a higher level of data integrity.

There are several parameter settings used to maintain high speed capture performance. These parameters can include a capture program CPU affinity 820, a block size 822, and a capture file size 824.

The capture program CPU affinity 820 can manage the execution location of the capture program. The capture program can have affinity with certain cores. This means that other programs inside the system, such as packet search, replay and processes that are native with the operating system, will be directed towards other cores that are not in use by the capture program.

The block size 822 can control the block size within the storage devices. For example, the file system can have a block size of 1 MB to optimize the file system of the storage devices for larger files and fast serial writes.

The capture file size 824 can control the size of each of the capture files 140. A minimum capture file size of 500 MB can prevent too much file metadata to be processed by the file system. There are no maximum file size restrictions. The parameter settings can be managed on a system-wide basis that can be pre-determined in advance of regular operation by the end user.

Figure 9:
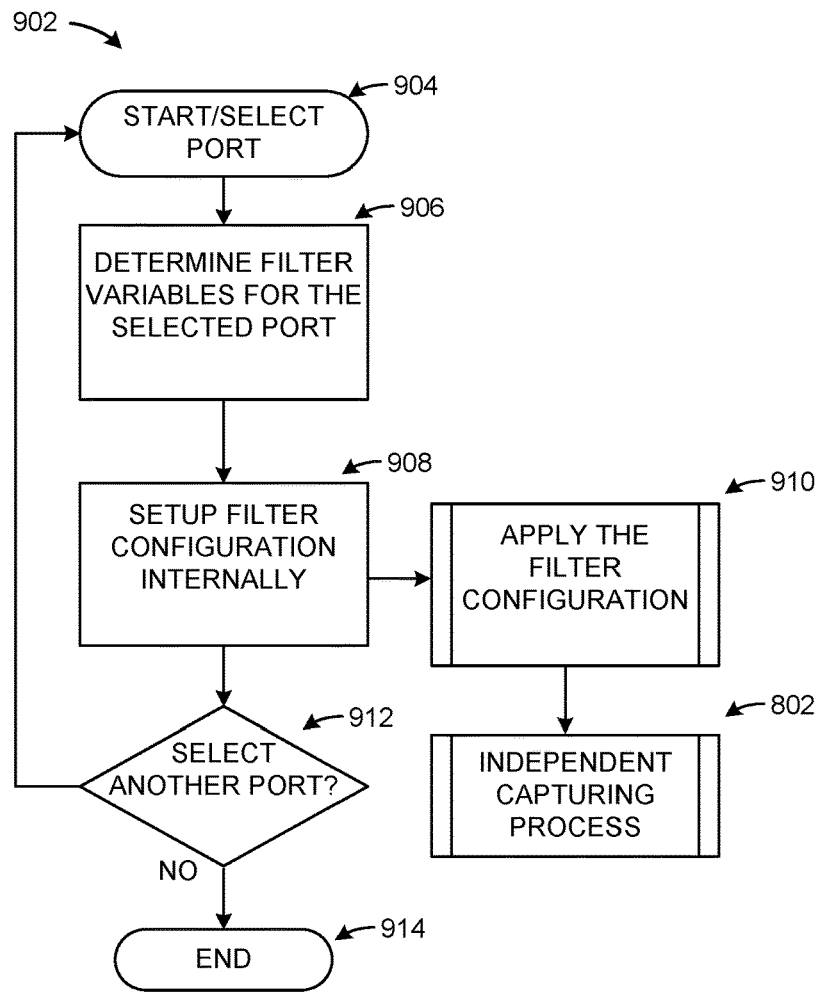
FIG. 9 is shown an example of an independent filtering process.

Referring now to FIG. 9, therein is shown an example of an independent filtering process 902. The independent filtering process 902 can configure each of the network filters 306 for the network ports 116 of FIG. 1.

The independent filtering process 902 can begin at a filtering start step 904. The filtering start step 904 can select one of the network ports 116. The control flow can then pass to a filtering variables step 906.

The filtering variables step 906 can provide filter variables 916 for one of the network ports 116. The filter variables 916 can include the protocol and priority for one of the network filters 306 used to capture the network traffic 108 of FIG. 1. After completion, the control flow can then pass to a filtering setup step 908.

The filtering setup step 908 can perform the setup of the internal configuration of one of the network filters 306. The setup can include a filtering apply filter step 910 to apply the new filter configuration information to the network filters 306. After the network filters 306 have been configured, the independent port capture process 802 can use the new filter configurations. After completion, the filtering setup step 908 can pass the control flow to a filtering another step 912.

The user can configure the filters using a user interface. Internally, the system saves the filter specification via a filter configuration file 918. The filter configuration file 918 can be implemented in a variety of ways. For example, the filter settings for physical port 0 and capture number 0 which captures packets that have HTTP port 80 for both source and destination traffic) can have a file name of filter_0_0.cfg) with an exemplary record as follows: Filter[Port=0, Capture-Stream=0, Command(ip.src.port: 80 or ip.dst.port: 80)]

The filter configuration file 918 can be used by the capture program, such as using a command line of "capture-port=0-file_stream=/arr/vol/dir/stream_1-filter=filter_0_0.cfg".

After executing the capture program, the program will read the filter configuration file and is passed on in a function that will apply the filter.

The filtering another step 912 can check to see if another one of the network ports 116 can be selected. If so, then the control flow can pass to the filtering start step 904. If not, then the process can terminate in a filtering end step 914.

Independent filtering can provide many benefits. For example, independent filtering can provide full utilization of a physical port by having 8 independent filters. Having a single filter can limit the capturing capability of a physical port since all the packets that do not match a filter requirement are discarded. With independent filtering, the packets can be filtered, but the non-filtered traffic can still be retained.

In another example, the HTTP traffic can be filtered while the TCP traffic independent filtering is still captured by another filter. For non-independent filtering, HTTP traffic is captured but other traffic has to be discarded. With independent capturing, further granularity is achieved by utilizing a greater number of filters.

It has been discovered that the independent filtering process 902 improves flexibility by allowing each of the network filters 306 to be reconfigured without interfering with the other ones of the network filters 306. Individual parameter setting provides finer grained filtering without needing to interfere with the network filters 306.

Figure 10:
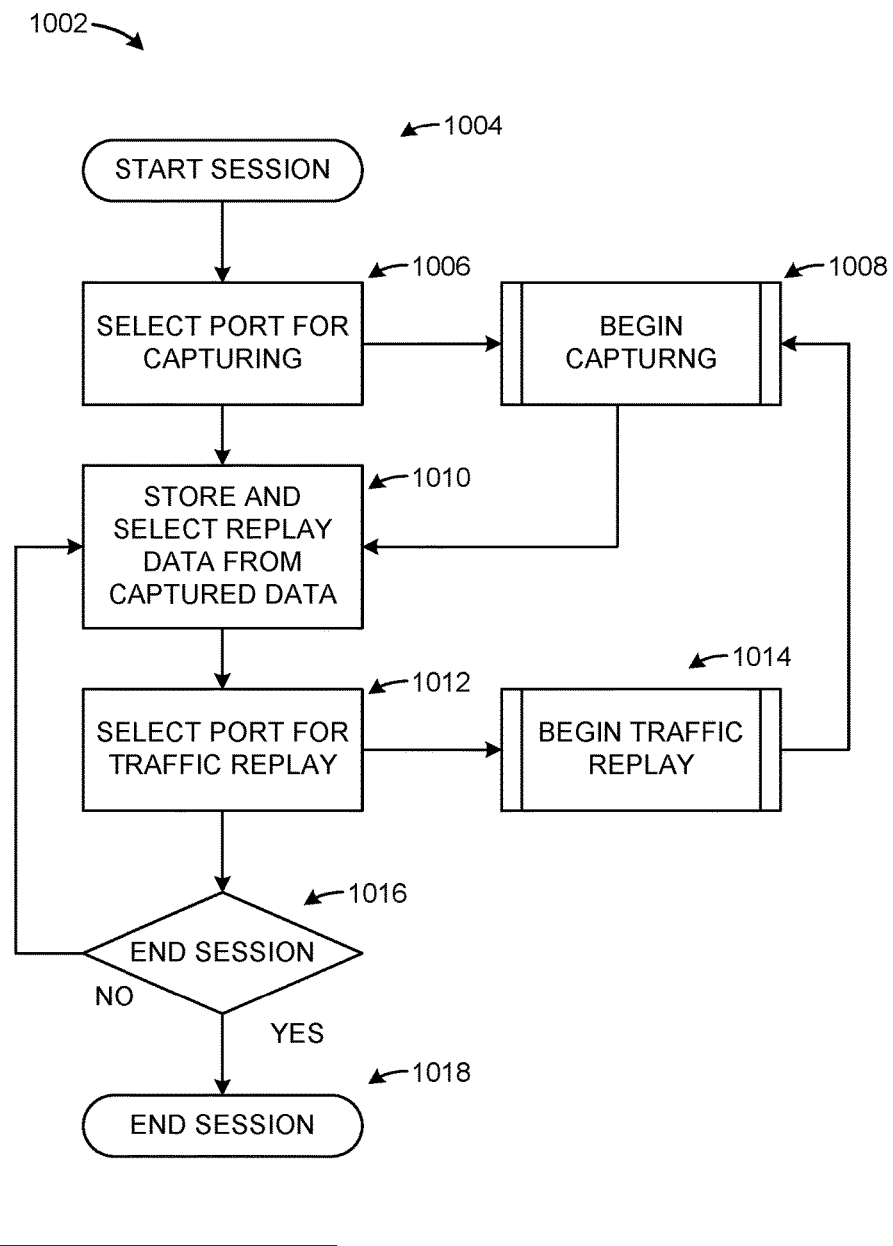
FIG. 10 is shown an example of a traffic replay process.

Referring now to FIG. 10, therein is shown an example of a traffic replay process 1002. The traffic replay process 1002 can simulate the network traffic 108 of FIG. 1 gathered earlier.

The traffic replay process 1002 can have a variety of configurations. For example, the traffic replay process 1002 can begin at a replay start step 1004. The replay start step 1004 can pass the control flow to a replay select port step 1006.

The replay select port step 1006 can identify and select one of the network ports 116 of FIG. 1 to be used for capturing the network traffic 108. The control flow can then pass to a replay begin capturing step 1008.

The replay begin capturing step 1008 can initiate the capture of the network traffic 108 on the current one of the network ports 116. After completion, the control flow can pass to a replay store and select step 1010.

The replay store and select step 1010 can store the network traffic 108 as the captured data 762 of FIG. 7 in the storage units 104 of FIG. 1 and then select a portion of the captured data 762 for replay. Replay is the process of generating the network traffic 108 based on the captured data 762. A replay begin replay traffic step 1014 can perform the action of starting the replay the captured data 762. After completion, the control flow can pass to a replay select replay port step 1012.

In an illustrative example, the network traffic 108 can be replayed from port-0 through the external network 102. The network traffic 108 can loop back across the external network 102 to go to port-1 within the same system. The port-1 can begin capturing the network traffic 108 from the external network 102, which includes portion of the network traffic 108 replayed from port-0. The port-1 can begin capturing network traffic 108 in the replay begin capturing step 1008. This can be functionally similar to a feedback loop using the network traffic 108 for capture and replay.

In an illustrative example, we have a process as follows: Step A: Replay traffic from Port-0. Step B: capture replayed traffic using Port-1. And Step C: Replay captured traffic from Port-1 by using Port-0. Repeat at Step B.

The replay select replay port step 1012 can select one of the network ports 116 to be used to replay the captured data 762 to create the network traffic 108.

The replay begin replay traffic step 1014 can generate replayed traffic 1020 from the captured data 762. After completion, the control flow can pass to a replay check end step 1016.

The replay check end step 1016 can redirect the control flow to the replay store and select step 1010 if more data should be captured and replayed. Otherwise, the control flow can pass to a replay end step 1018 and the process can terminate.

It has been discovered that the traffic replay process 1002 can effectively reproduce longer sequences of network traffic 108 by replaying the data from the capture files 140 of FIG. 1. The inherent parallelism of multiple files provides faster access to more data to effectively replay the network traffic 108.

The system can replay longer sequences of the network traffic 108 using more than one of the capture files 140. Larger files are better suited for replaying because the memory buffers are bypassed and the captured data is read directly from the storage devices. This can improve the technology of replaying the network traffic 108 by providing higher bandwidth.

Figure 11:
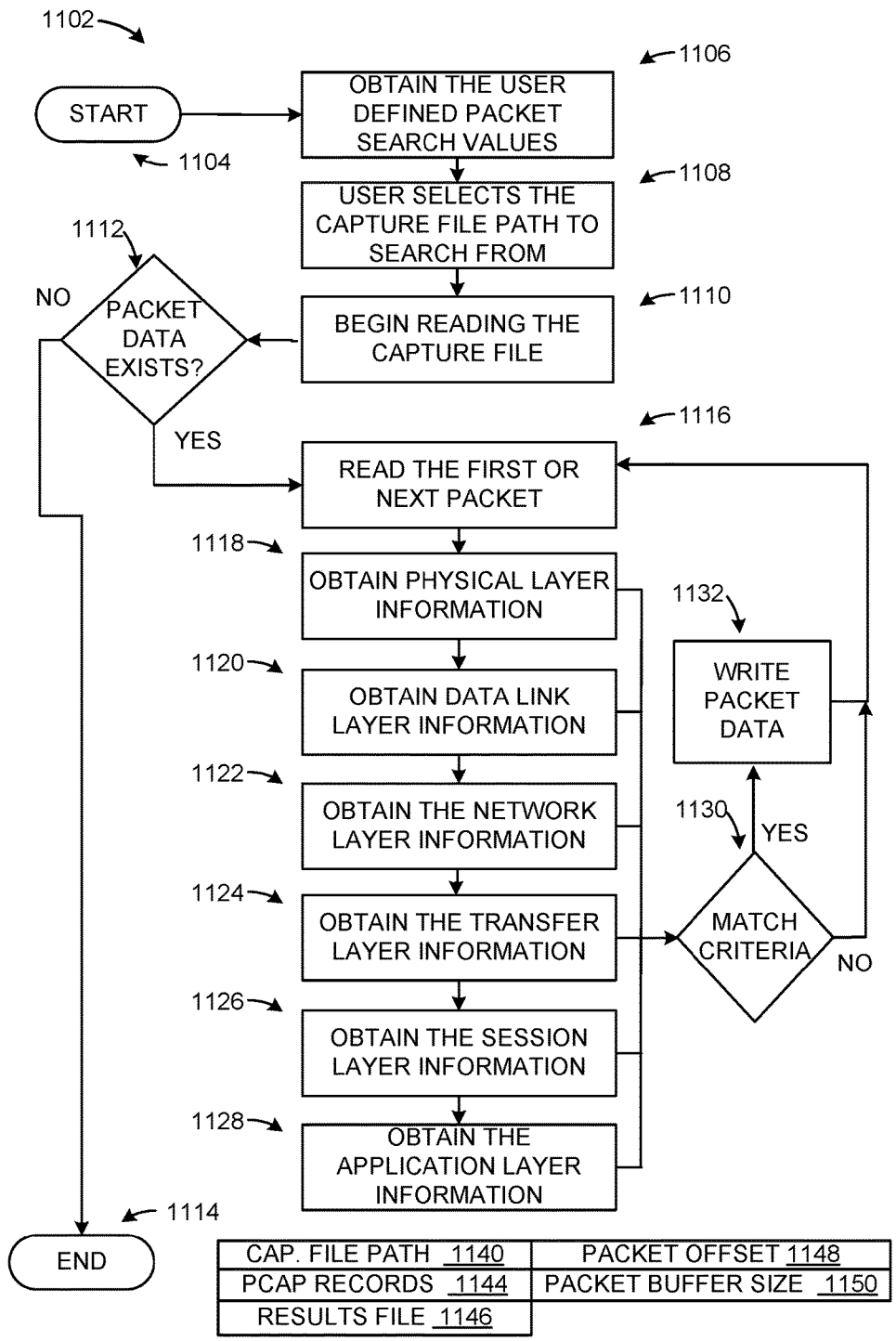
FIG. 11 is shown an example of a packet search process.

Referring now to FIG. 11, therein is shown an example of a packet search process 1102. The packet search process 1102 can search the PCAP data 206 of FIG. 2 to identify the network packets 138 of FIG. 1 that match search values 764 of FIG. 7.

The packet search process 1102 can start at a search start step 1104 and pass the control flow to a search obtain values step 1106. It is understood that the search start step 1104 can include any initialization processing required by the process.

The search obtain values step 1106 can allow the entry of the search values 764. The search obtain values step 1106 can obtain the user defined packet search values 764. The search values 764 are network-related parameters used to identify specific values in the PCAP data 206. For example, the search values 764 can include protocol type, date, time, source IP address, destination IP address, port number, keywords, or a combination thereof. After completion, the control flow can pass to a search path step 1108.

The search path step 1108 can allow the entry of a capture file path 1140 used to search the PCAP data 206 using the search values 764. The search path step 1108 can allow the user to select the capture file path 1140 to search from. The capture file path 1140 is the location of one or more of the capture files 140 of FIG. 1. The capture files 140 contain the captured data 762 of FIG. 7. Because of the large volumes of data captures, the captured data 762 can include many individual files. The capture file path 1140 is the location of any one of the files used to hold the captured data 762. After completion, the control flow can pass to a search begin read step 1110.

The search begin read step 1110 can start the process of reading the capture files 140. The search begin read step 1110 can begin reading the capture files 140. The search begin read step 1110 can include any initialization or validation operations needed to open and read the capture files 140. After completion, the control flow can pass to a search check data exists step 1112.

The search check data exists step 1112 can check if one of the capture files 140 contains the PCAP data 206. The search check data exists step 1112 can check if the packet data exists. If the PCAP data 206 exists, then the control flow can pass to a search read PCAP step 1116. If the PCAP data 206 does not exist, then the control flow can pass to a search end step 1114 for termination of the process.

The search read PCAP step 1116 can read the next available one of the PCAP records 1144 from the capture files 140. The search read PCAP step 1116 can read the first or next packet. After reading the PCAP data 206, the packet search process 1102 can obtain different types of data from the PCAP records 1144. The different types of data can correspond to the different abstraction layers of the open systems interconnection (OSI) model for network communication. The control flow can then pass to a succession of steps including a search physical layer step 1118, a search data link layer step 1120, a search network layer step 1122, a search transfer layer step 1124, a search session layer step 1126, a search application layer step 1128, a search match criteria step 1130, and a search write packet step 1132. The search match criteria step 1130 can check if there is a match to the criteria.

The search physical layer step 1118 can obtain the physical layer information from the PCAP records 1144 in the capture files 140 and pass them to the search match criteria step 1130 to see if there is a match between the physical layer information and the search values 764. The search physical layer step 1118 can obtain physical layer information. If the physical layer information matches the search values 764, then the control flow can pass to the search write packet step 1132. If there is no match, then the control flow can pass back to the search read PCAP step 1116.

The search data link layer step 1120 can obtain the data link layer information from the PCAP records 1144 in the capture files 140 and pass them to the search match criteria step 1130 to see if there is a match between the data link layer information and the search values 764. The search data link layer step 1120 can obtain data link layer information. If the data link layer information matches the search values 764, then the control flow can pass to the search write packet step 1132. If there is no match, then the control flow can pass back to the search read PCAP step 1116.

The search network layer step 1122 can obtain the network layer information from the PCAP records 1144 in the capture files 140 and pass them to the search match criteria step 1130 to see if there is a match between the network layer information and the search values 764. The search network layer step 1122 can obtain the network layer information. If the network layer information matches the search values 764, then the control flow can pass to the search write packet step 1132. If there is no match, then the control flow can pass back to the search read PCAP step 1116.

The search transfer layer step 1124 can obtain the transfer layer information from the PCAP records 1144 in the capture files 140 and pass them to the search match criteria step 1130 to see if there is a match between the transfer layer information and the search values 764. The search transfer layer step 1124 can obtain the transfer layer information. If the transfer layer information matches the search values 764, then the control flow can pass to the search write packet step 1132. If there is no match, then the control flow can pass back to the search read PCAP step 1116.

The search session layer step 1126 can obtain the session layer information from the PCAP records 1144 in the capture files 140 and pass them to the search match criteria step 1130 to see if there is a match between the session layer information and the search values 764. The search session layer step 1126 can obtain the session layer information. If the session layer information matches the search values 764, then the control flow can pass to the search write packet step 1132. If there is no match, then the control flow can pass back to the search read PCAP step 1116.

The search application layer step 1128 can obtain the application layer information from the PCAP records 1144 in the capture files 140 and pass them to the search match criteria step 1130 to see if there is a match between the application layer information and the search values 764. The search application layer step 1128 can obtain the application layer information. If the application layer information matches the search values 764, then the control flow can pass to the search write packet step 1132. If there is no match, then the control flow can pass back to the search read PCAP step 1116. Although not shown in the figures, it is understood that when there is no more data available in the capture files 140, the control flow can pass to the search end step 1114.

The search write packet step 1132 can write the PCAP data 206 that matched the search values 764 to a results file 1146. The search write packet step 1132 can write packet data to the results file 1146. The results file 1146 is a data file for storing the PCAP data 206 that matches the search values 764. The results file 1146 can be used to generate reports about the matching data. After the search write packet step 1132 completes, the control flow can pass back to the search read PCAP step 1116.

The packet search process 1102 can search the capture files 140 in both compressed and uncompressed format. The compressed versions of the capture files 140 can be searched in a variety of ways. For example, the packet search process 1102 can search the compressed version of the capture files 140 by parsing the search values 764 and extracting keywords that can be searched for in their compressed format in the capture files 140. In another example, the search values 764 can be compressed and the compressed value used as the search values 764. In yet another example, the packet search process 1102 can incrementally decompress the capture files 140 as needed to perform the search operation.

The packet search process 1102 can search continuous and non-continuous ranges of the capture files 140. The capture files 140 can be identified with a sequential value to indicate the relationship between the capture files 140. The capture files 140 can be identified with a numerical value, an alphanumerical value, a text value, or a combination thereof.

It has been discovered that searching the capture files 140 in compressed and uncompressed format increases performance and flexibility. The reduced size of the capture files 140 that are compressed allows for faster searching of the data based on a smaller footprint of the compressed data.

While packet search is performed on compressed files, the search program can open a file stream for compressed files, such as by using the deflate function in zlib library. Two values are tracked during the search for compressed files: a packet offset 1148 and a packet buffer size 1150.

Initially, the packet offset 1148 can have a value of 0 to indicate the starting point of the first packet. This can be n−1 for the last packet where 'n' is the last packet number. The packet buffer size 1150 can be the number of packets to decompress upon searching. A portion of the file is decompressed based on the number of packets in the packet buffer size 1150.

After decompression, the packets are searched in the same way that packets are searched during a regular non-compressed packet search. Once the search is finished, the packet offset 1148 is increased in value by the packet buffer size 1150 and the used memory can be cleaned up. This process is repeated until the last packet has been searched. The compressed files contain the same amount of information than non-compressed files; compressed files are packaged in a way that takes less space than non-compressed files.

Figure 12:
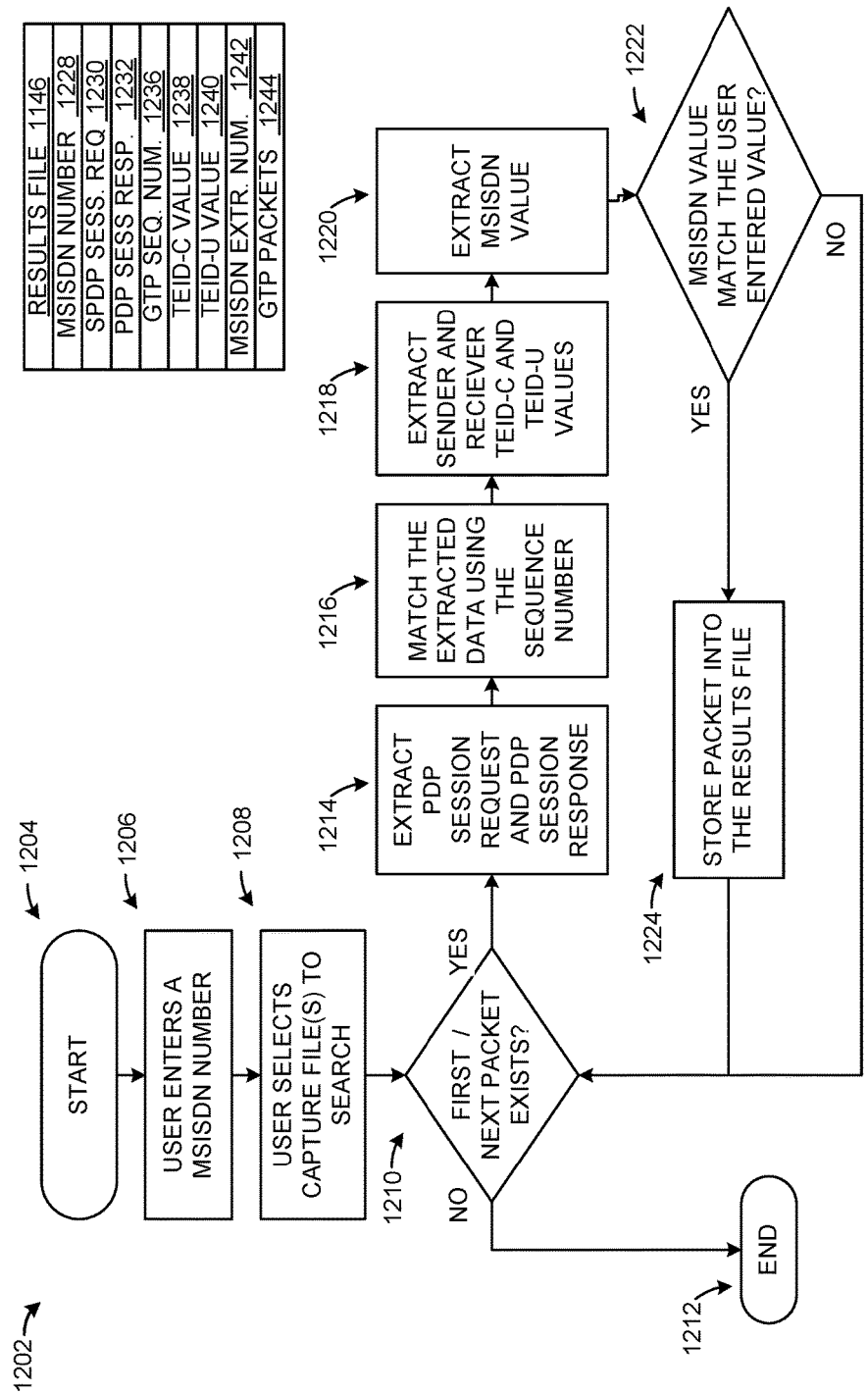
FIG. 12 is shown an example of a GPRS tunneling protocol search process (GTP).

Referring now to FIG. 12, therein is shown an example of a GPRS tunneling protocol search process 1202 (GTP). A GTP search process 1202 can identify GTP packets 1244 in the capture files 140.

The GTP search process 1202 can search the capture files 140 for GTP packets and save the identified packets in the results file 1146. The results file 1146 can be an output file for storing the PCAP data 206 of FIG. 2.

The GTP search process 1202 can begin with a GTP start step 1204 and then pass control to a GTP enter MSISDN step 1206. It is understood that the GTP start step 1204 can include any initialization processing required by the process.

The GTP enter MSISDN step 1206 can allow the user to enter a MSISDN number 1228 for the search. The MSISDN number 1228 is a value designating the mobile subscriber identification. After completion, the control flow can pass to a GTP enter capture file step 1208.

The GTP enter capture file step 1208 can allow the user to enter the names of the capture files 140 to be used for search. In the GTP enter capture file step 1208 the user selects the capture files 140 to search. After completion, the control flow can pass to a GTP check packet exists step 1210.

The GTP check packet exists step 1210 can determine if there is available data within the capture files 140. The GTP check packet exists step 1210 can check if the first or next packet exists. If the capture files 140 have additional data records available, then the control flow can pass to a GTP extract PDP step 1214. If the capture files 140 do not have additional date records available, then the GTP search process 1202 can terminate at a GTP end step 1212.

The GTP extract PDP step 1214 can extract packet protocol (PDP) data from the capture files 140 including a PDP session request 1230 and a PDP session response data 1232. The GTP extract PDP step 1214 extracts the PDP session request and PDP session response. After completion, the control flow can pass to a GTP sequence match step 1216.

The GTP sequence match step 1216 can match the extracted PDP data using a GTP sequence number 1236. The GTP sequence number 1236 is a value representing the order of the packets. After completion, the control flow can pass to a GTP extract TEID step 1218.

The GTP extract TEID step 1218 can extract the sender and receiver TEID (tunnel endpoint identifier) values to uniquely identify the tunnel used. A TEID-C value 1238 (TEID Core) and a TEID-U value 1240 (TEID User) can be extracted from the PCAP data 206 of the capture files 140. The GTP extract TEID step 1218 can extract sending and receiver TEID-C and TEID U values. After completion, the control flow can pass to a GTP extract MSISDN step 1220.

The GTP extract MSISDN step 1220 can extract a MSISDN extracted number 1242 from the PCAP data 206 of the capture files 140. The GTP extract MSISDN step 1220 can extract MSISDN values. After completion, the control flow can pass to a GTP check MSISDN step 1222.

The GTP check MSISDN step 1222 can compare the MSISDN extracted number 1242 extracted from the capture files 140. The GTP check MSISDN step 1222 can check if the MSISDN value matches the user entered value. If the MSISDN extracted number 1242 matches the MSISDN number 1228, then the control flow can pass to a GTP store packet step 1224. If not, then the control flow can pass back to the GTP check packet exists step 1210.

The GTP store packet step 1224 can store the selected data in the results file 1146. After completion, the control flow can pass to the GTP check packet exists step 1210.

It has been discovered that using the MSISDN number 1228 search for the network packets 138 of FIG. 1 having a matching value of the MSISDN extracted number 1242 can simplify operations by efficiently selecting the GTP packets 1244. This improves the performance of generating GTP-related reports.

The GTP packet search is embedded in packet search program. The difference is that when packet search classifies a GTP packet, it goes in deeper than other protocols in the packet search algorithm. The GTP search is an extension of packet search for the GTP protocol.

Figure 13:
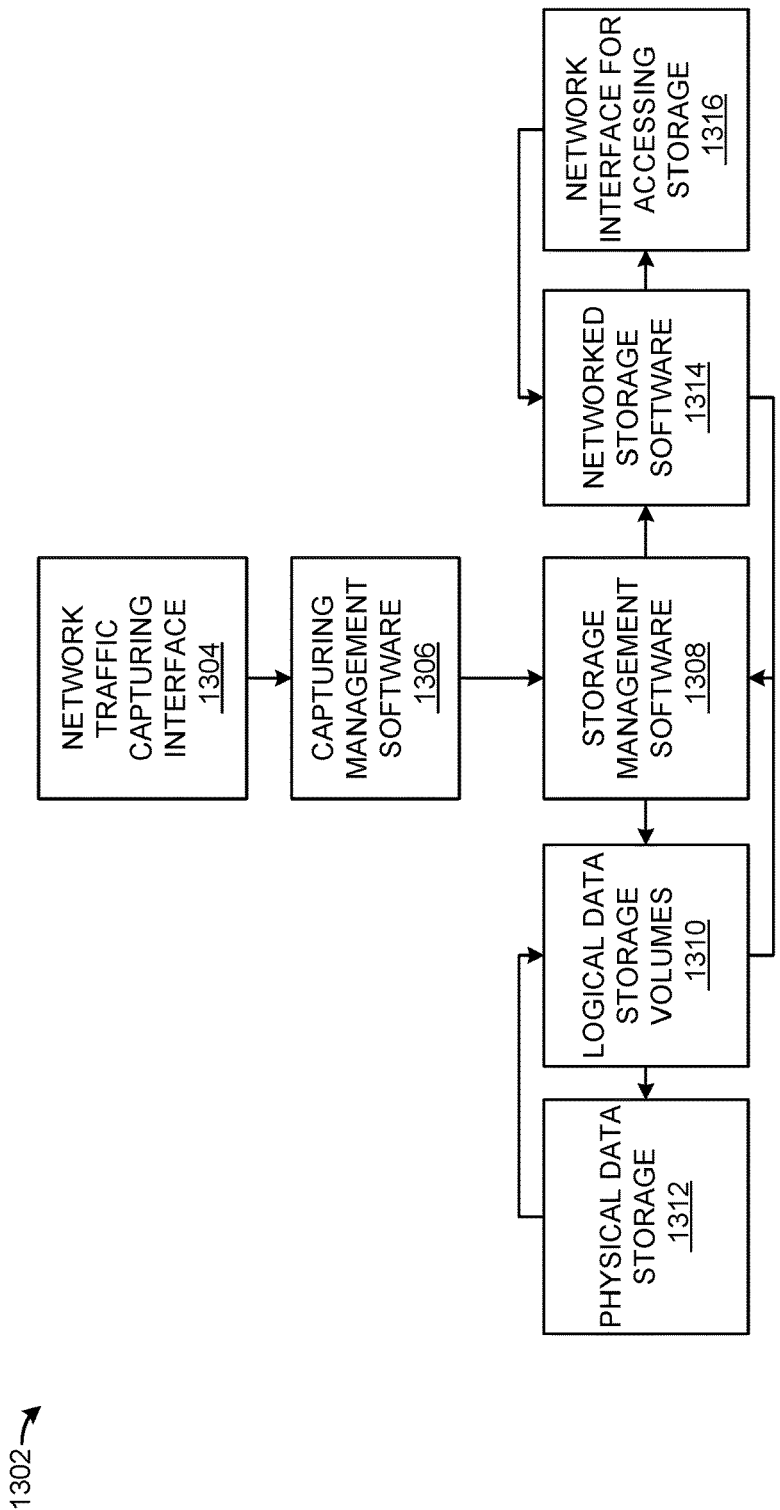
FIG. 13 is shown an example of an integrated storage configuration.

Referring now to FIG. 13, therein is shown an example of an integrated storage configuration 1302. The integrated storage configuration 1302 shows the relationship between the system components of the network traffic system 100 of FIG. 1.

The network traffic system 100 include a capturing management software 1306 coupled to a network traffic capture interface 1304 for capturing the network traffic 108 of FIG. 1. The capturing management software 1306 can be coupled to a storage management software 1308 for storing the network traffic 108 in the capture files 140 of FIG. 1.

The storage management software 1308 can store the data in logical data storage volumes 1310. The logical data storage volumes 1310 can be implemented using physical data storage 1312. For example, the physical data storage 1312 can include hard drives, solid state drives, optical drives, or a combination thereof. The storage management software 1308 can be coupled to a network storage software 1314 for storing the data in the cloud using a network interface for accessing storage 1316.

Figure 14:
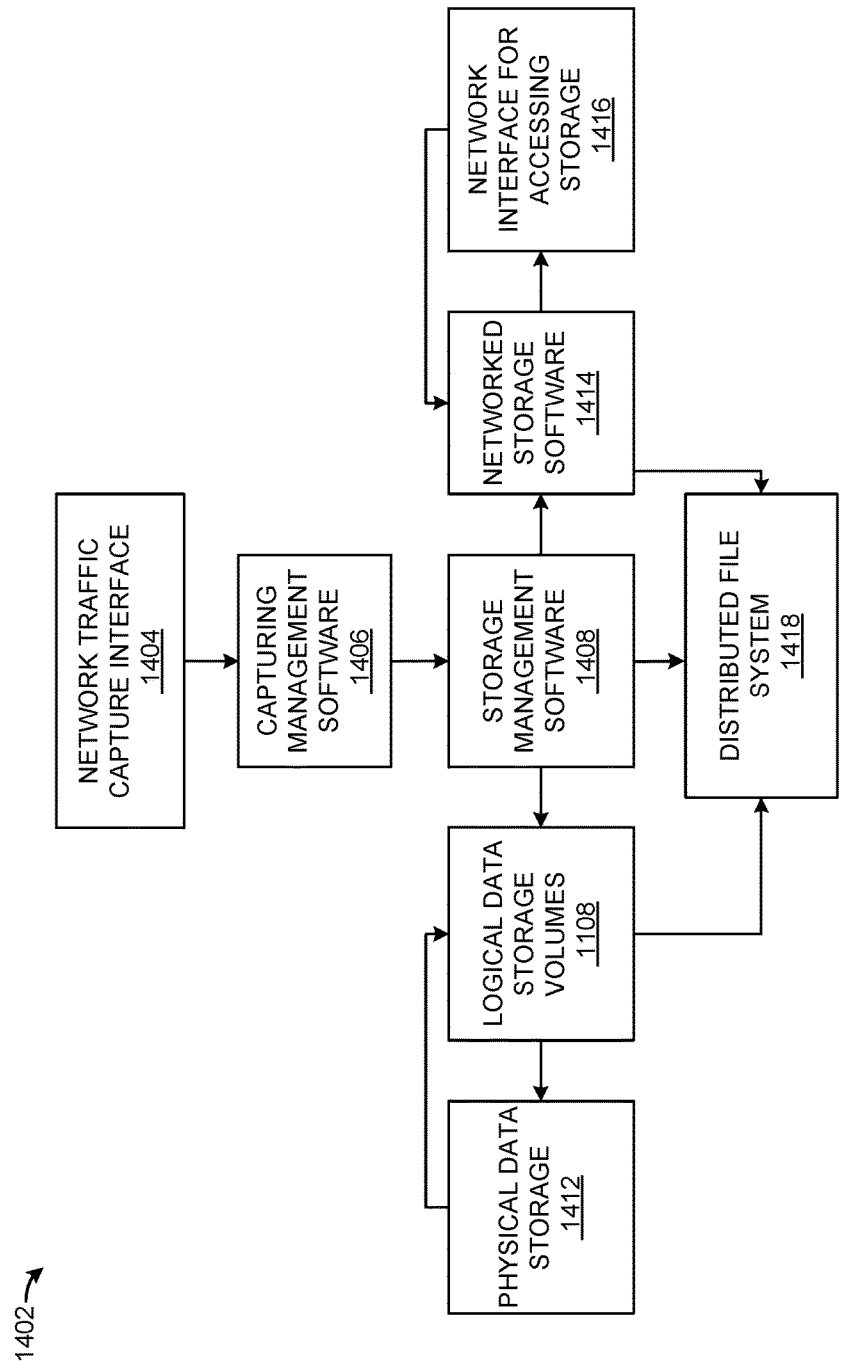
FIG. 14 is shown an example of a distributed file system integration configuration.

Referring now to FIG. 14, therein is shown an example of a distributed file system integration configuration 1402. The integrated storage configuration 1402 shows the relationship between the system components of the network traffic system 100 of FIG. 1.

The network traffic system 100 include a capturing management software 1406 coupled to a network traffic capture interface 1404 for capturing the network traffic 108. The capturing management software 1406 can be coupled to a storage management software 1408 for storing the network traffic 108 in the capture files 140.

The storage management software 1408 can store the data in logical data storage volumes 1410. The logical data storage volumes 1410 can be implemented using physical data storage 1412. For example, the physical data storage 1412 can include hard drives, solid state drives, hybrid storage drives, optical drives, or a combination thereof. The storage management software 1408 can be coupled to a network storage software 1414 for storing the data in the cloud, in a local network storage, or in a remote network using a network interface for accessing storage 1416.

A distributed file system 1418 coordinate access to files across a distributed set of devices. The distributed file system 1418 can be coupled to the storage management software 1408, the logical data storage volumes 1410, and the network storage software 1414.

Figure 15:
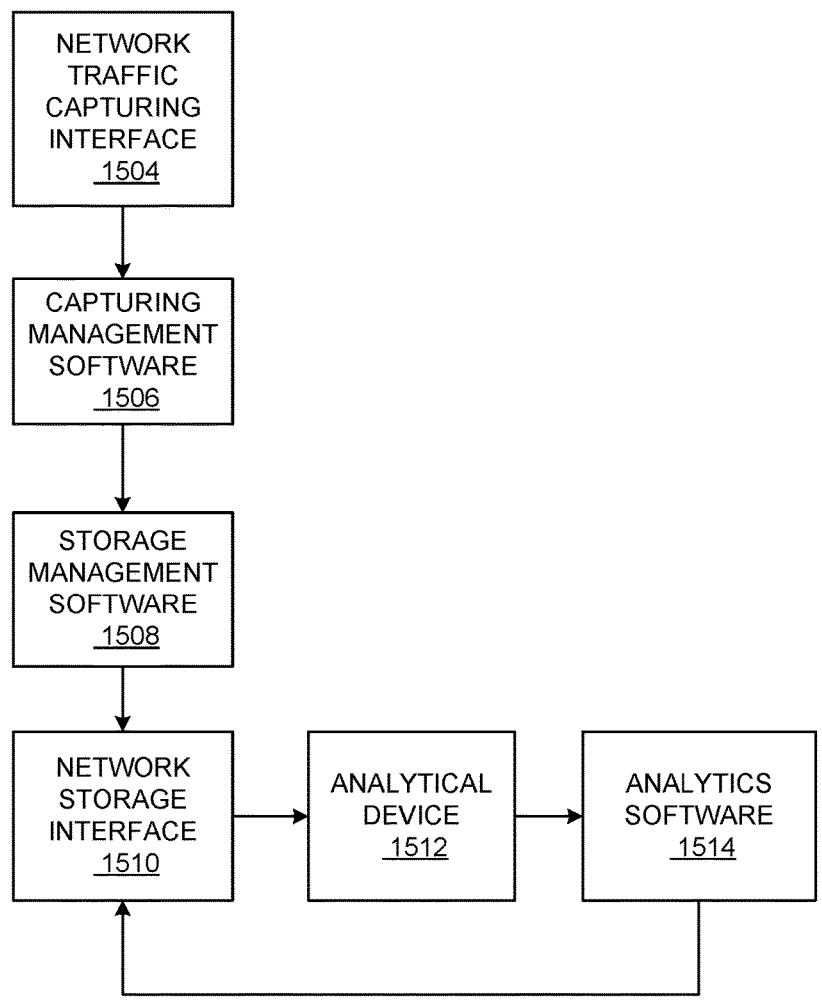
FIG. 15 is shown an example of an analytic device and software integration.

Referring now to FIG. 15, therein is shown an example of an analytic device and software integration 1502. The analytic device and software integration 1502 show the connection between the packet analyzer 106 of FIG. 1 and analytics software 1514 for processing the network traffic 108 of FIG. 1.

In the analytic device and software integration 1502, the network traffic capturing interface 1504 can gather the network traffic 108 of FIG. 1 and transfer it to a capturing management software 1506 where it can be stored by a storage management software 1508. The storage management software 1508 can be coupled to a network storage interface 1510 for storing the network traffic 108 and accessing the mass storage units 104 of FIG. 1.

An analytical device 1512 can be coupled to the network storage interface 1510. The analytical device 1512 is a unit for executing the analytics software 1514 to access and manipulate the network traffic 108 in the mass storage units 104. The analytics software 1514 can store the results of the analysis using the network storage interface 1510.

Figure 16:
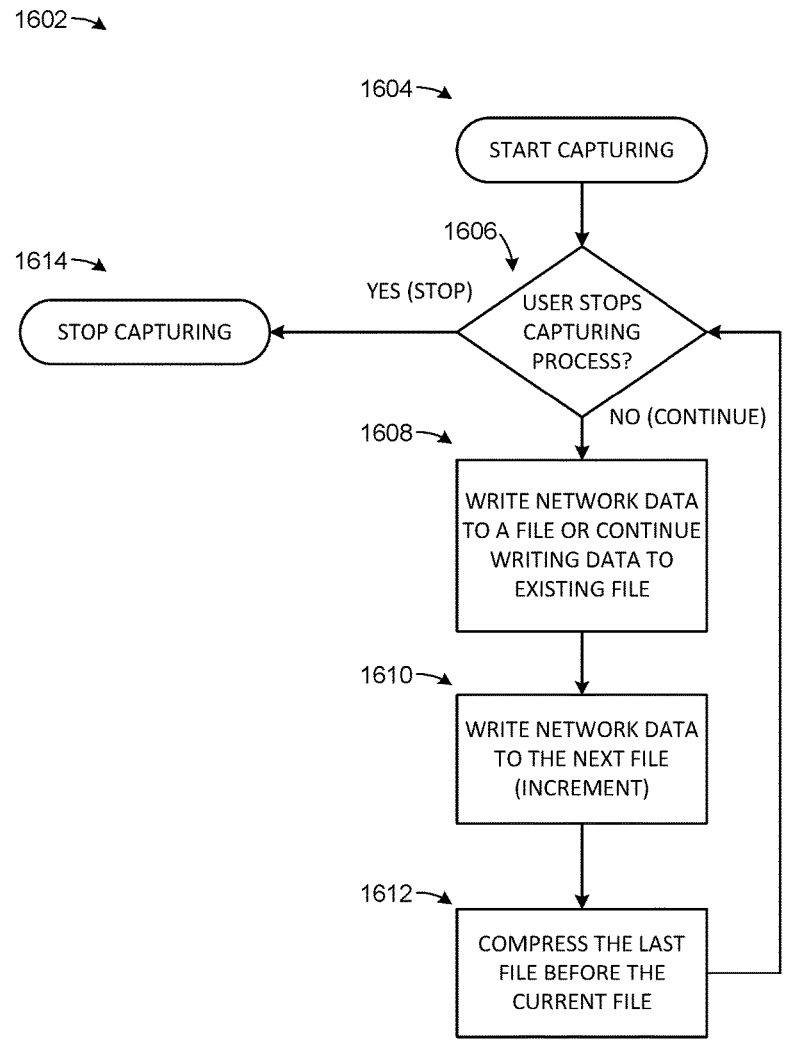
FIG. 16 is shown an example of concurrent compression process.

Referring now to FIG. 16, therein is shown an example of concurrent compression process 1602. The concurrent compression process 1602 can compress the network traffic 108 in parallel with gathering the network traffic 108 of FIG. 1.

The concurrent compression process 1602 can begin at a compression start step 1604 and pass the control flow to a compression check continue capture step 1606. It is understood that the compression start step 1604 can include any initialization processing required by the process.

The compression check continue capture step 1606 can allow the user to stop or continue with the data gathering. The compression check continue capture step 1606 checks if the user stops the capturing process. If the user chooses to stop, then the control flow can pass to a compression stop step 1614. If the user chooses to continue, then the control flow can pass to a compression write file step 1608.

The compression write file step 1608 can write the network traffic 108 to one of the capture files 140 of FIG. 1. The compression write file step 1608 can write network data to a file or continue writing data to an existing file. Each of the capture files 140 can be a new file or an existing file. After completion, the control flow can pass to a compression write next file step 1610.

The compression write next file step 1610 can write the network traffic 108 to another one of the capture files 140. The compression write next file step 1610 can write network data to the next file and increment the file identifier. The existing one of the capture files 140 can be closed and a new one of the capture files 140 created with an incremented identification value. After completion, the control flow can pass to a compression last file step 1612.

The compression last file step 1612 can compress the last of one the capture files 140 before the current file. The compression last file step 1612 can be done in a variety of ways. For example, the compression operation can be done in parallel in a separate computer thread, in a separate thread on another processing unit, directly in the storage management software 1308 of FIG. 13, or a combination thereof. After completion, the control flow can pass back to the compression check continue capture step 1606.

The concurrent compression process 1602 can compress the capture files 140 in a variety of ways. The concurrent compression process 1602 can use different lossless compression methods including the Huffman-based LZ77 compression method, Burrows-Wheeler transform encoding, Lempel-Ziv-Welch (LZW) coding, entropy encoding, arithmetic coding, adaptive arithmetic coding, context tree weighting, predictive methods, or other similar compression techniques.

Because of the regular repetitive nature of much of the network traffic 108, compression techniques that exploit encoding repeated sequences of characters are particularly effective. A particular sequence can be encoded by a pair of numbers where each of the next length of characters is equal to the characters exactly distance characters behind in the uncompressed stream. Optimizing the length-distance pair structure by encoding predicted character string sequences can further improve compression performance.

In an illustrative example, the network traffic system 100 of FIG. 1 can gather the network traffic 108 through one or more of the network filters 306 of FIG. 3 and store the network traffic 108 as PCAP data 206 of FIG. 2 in one of the capture files 140. The network traffic 108 can be stored in a set of the capture files 140 each holding a portion of the network traffic 108. The capture files 140 can include the first capture file 144, the second capture file 146, the third capture file 148, or additional enumerated files.

Once the first capture file 144 has reached a predetermined size, the first capture file 144 can be closed and the second capture file can be created to store the continuing stream of data coming from the network filters 306, such as the second network packet 152. The first capture file 144 can be compressed in parallel or concurrently with the additional gathering of the network traffic 108 and the storing of the second network packet 152 in the second capture file 146.

In another example, a current file 1616 can be the one of the capture files 140 currently used for gathering the network traffic 108. A last file 1618 can be the previous one of the capture files 140 that was closed and can now be compressed.

It has been discovered that compressing the network traffic 108 in parallel with gathering the network traffic 108 increases performance and reduces data storage volume. Performing the data compression of one portion of the network traffic while concurrently gathering another portion of the network traffic 108 increases performance by allowing the uninterrupted gathering the network traffic 108 while storing the data.

It has been discovered that compressing the network traffic 108 using dictionary coder methods can reduce the size of the compressed files and increase system performance. Because of the regular repetitive nature of the network traffic 108, significant increases in compression performance are achieved.

Multithreading used to perform parallel compression of blocks. Signaling mechanisms such as mutexes and semaphores can be used to prevent any conflicts, such as race conditions, between threads accessing the same block. When compression starts, the system can employ block splitting for blocks bigger than 1 MB in block size. This allows additional parallelism as each portion of the split block goes through a separate compression process running in a different thread. Each of the different threads can run in other cores and can take place in a system with multi-CPU architecture for additional performance benefit with parallelism.

The system performance can be improved by running multiple threads in separate processors and cores. For programs that require large amounts of processing power such as compression and capturing programs, the program affinity can be set to cover different cores to minimize processor resource competition and conflict.

Figure 17:
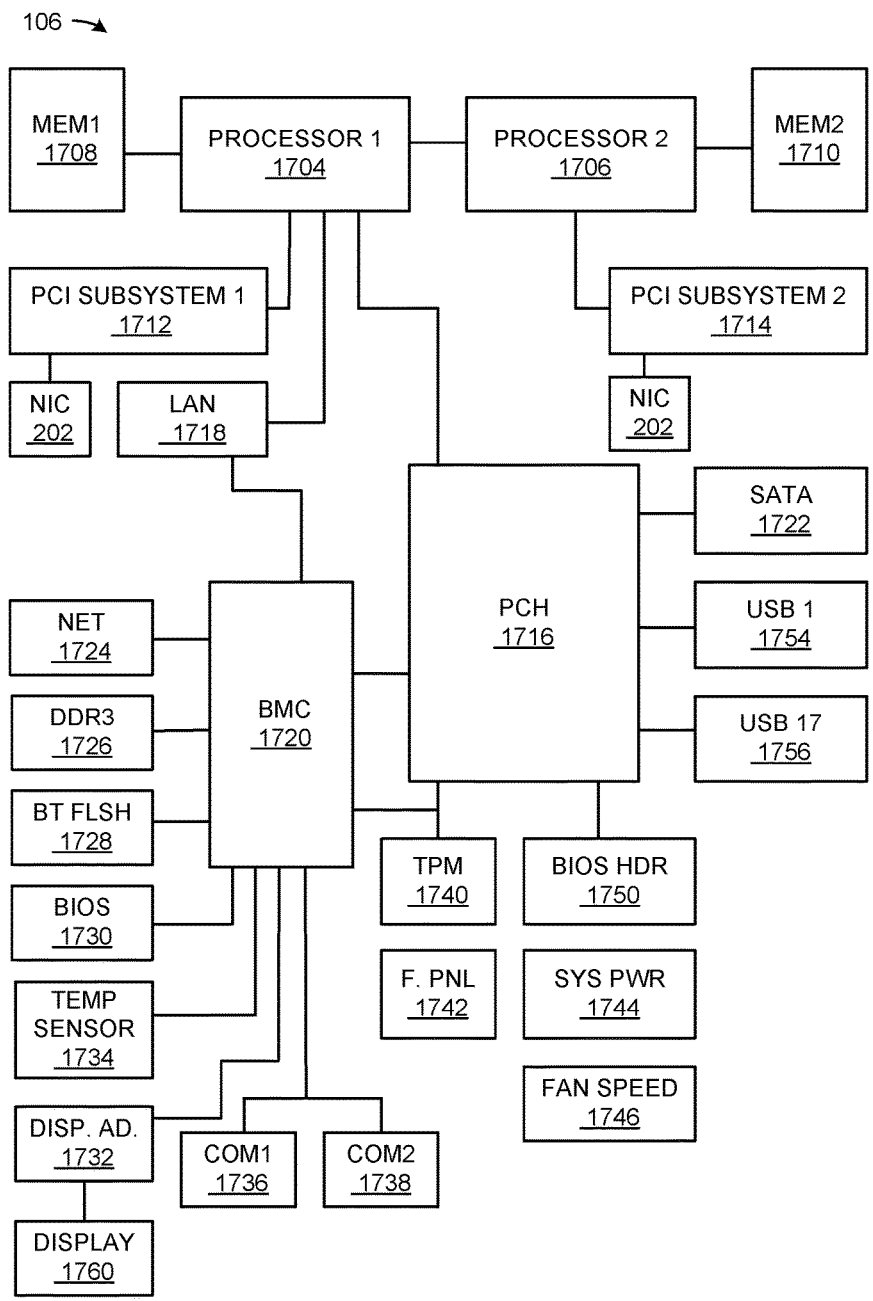
FIG. 17 is an example of the packet analyzer.

Referring now to FIG. 17, therein is shown an example of the packet analyzer 106. The packet analyzer 106 is a computing system coupled to the external network 102 of FIG. 1 for receiving and processing the network traffic 108 of FIG. 1.

The packet analyzer 106 can have a variety of configurations. For example, the packet analyzer 106 can include a first processor 1704, a second processor 1706, a first dynamic memory 1708, a second dynamic memory 1710, a first PCI unit 1712 (peripheral component interconnect), a second PCI unit 1714, a platform controller hub 1716 (PCH), a LAN controller 1718 (local area network), a baseboard management controller 1720 (BMC), and storage units 104 of FIG. 1.

The first processor 1704 and the second processor 1706 can be computing units for executing stored software and computer code. The first processor 1704 can be coupled to the second processor 1706.

The processors can be coupled to the first dynamic memory 1708 and the second dynamic memory 1710, respectively, to provide memory areas for executing the software and for temporary storage of data. The first dynamic memory 1708 and the second dynamic memory 1710 can have a variety of configurations. For example, the first dynamic memory 1708 and the second dynamic memory 1710 can be dynamic random access memory (DRAM) in configurations such as DIMM, SIMM, or other similar memory package formats.

The first processor 1704 can be coupled to the first PCI unit 1712. The first PCI unit 1712 is an interface for connecting to peripheral devices, such as the network interface card 202 or other communication devices. The first PCI unit 1712 can have one or more slots for attaching the peripheral devices.

The second processor 1706 can be coupled to the second PCI unit 1714. The second PCI unit 1714 is an interface for connecting to peripheral devices, such as the network interface card 202 or other communication devices. The second PCI unit 1714 can have one or more slots for attaching the peripheral devices.

The first processor 1704 can be coupled to the LAN controller 1718. The LAN controller 1718 is a local area networking device for communicating with other devices. The LAN controller 1718 can be used for network communication within the network traffic system 100 of FIG. 1.

The network traffic system 100 can include the baseboard management controller 1720. The BMC 1720 is a controller unit for managing data traffic and peripheral control within the network traffic system 100. The BMC 1720 can manage communication and peripheral devices to offload processing load from the main processors.

The BMC 1720 can be coupled to a variety of components within the network traffic system 100. For example, the BMC 1720 can be connected to a network adapter 1724, a BMC memory unit 1726, a BMC boot flash unit 1728, BMC BIOS 1730, a display adapter 1732, a display device 1760, a temperature sensor 1734, a first serial communication connector 1736, and a second communication header 1738.

The display adapter 1732 can be coupled to the display device 1760. The display device can be used for displaying reports, search results, visual representations of the network traffic, status information, or a combination thereof. For example, the display device 1760 can display data on a web browser interface to both control the network traffic system 100 and display reports or search results.

The network traffic system 100 can include a platform controller hub 1716. The PCH 1716 is a controller for managing certain data paths and support functions. The PCH 1716 can manage clocking of the system clock, the flexible display interface, the direct media interface, and other similar components of the packet analyzer 106. The PCH can be coupled directly to the first processor 1704 and the BMC 1720.

The PCH 1716 can be coupled to a trusted platform module 1740 (TPM). The TPM 1740 is a specialized security device for supporting hardware authentication. The TPM 1740 can also be coupled to a BIOS header 1750. In other configuration, the PCH 1716 can be directly and indirectly coupled to a front panel 1742, a system power unit 1744, and a fan speed control 1746.

The PCH 1716 can be connected to mass storage devices, such as disk drives connected via a Serial AT Attachment interface (SATA). Mass storage devices 1748 can be hard drives, solid-state drives, optical drives, or a combination thereof. Although mass storage devices 1748 are shown as SATA devices, it is understood that other configuration and connection are possible.

The PCH 1716 can be connected to other communication interfaces such as a Universal serial bus 2.0 interface 1752 (USB 2.0), a USB 3.0 interface 1756, or other communication bus interfaces. The USB 2.0 interface 1754 and the USB 3.0 interface 1756 can be used to connect to peripheral devices including disks or other mass storage devices.

The packet analyzer 106 can include the network interfaces 114 of FIG. 1 for connect to the external network 102. The network interfaces 114 can include network interface cards 1758 (NIC). The network interface cards 1758 can include Ethernet cards, Gigabit Ethernet cards, or other network communication interfaces.

The first processor 1704 and the second processor 1706 can execute software (not shown) to operate the packet analyzer 106. The network interface cards 1758 can be coupled to the processors via the first PCI unit 1712 and the second PCI unit 1714. The storage units 104 can be coupled to the first processor 1704 via the PCH 1716.

Figure 18:
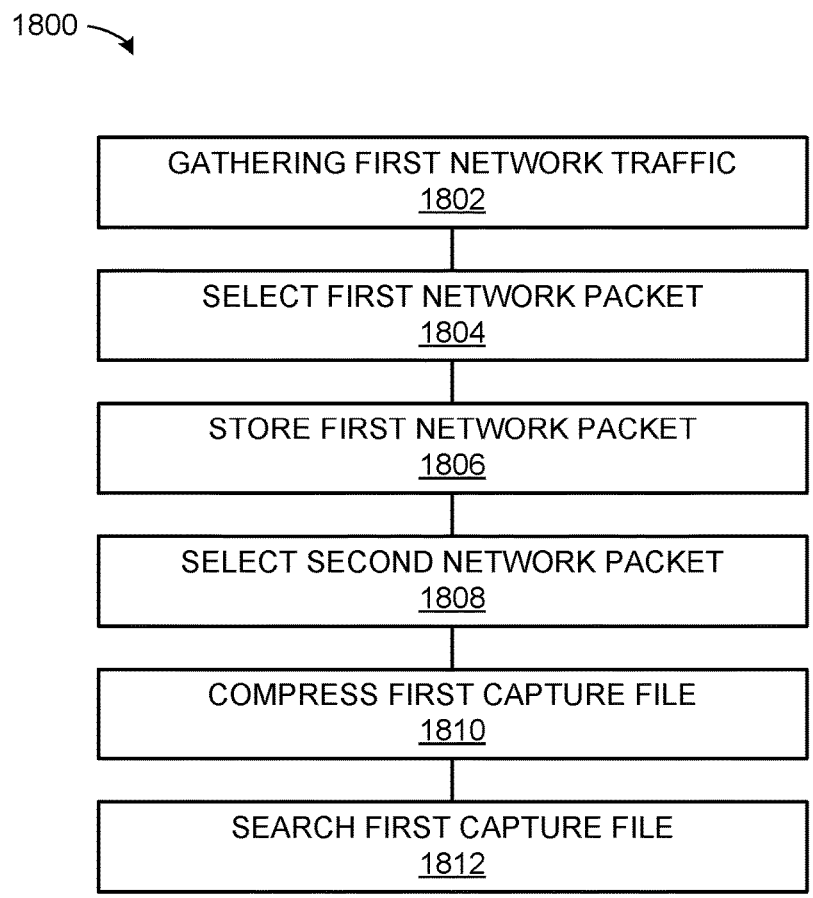
FIG. 18 is a flow chart of a method of operation of a network traffic system in a further embodiment of the present invention.

Referring now to FIG. 18, therein is shown a flow chart of a method 1800 of operation of a network traffic system in a further embodiment of the present invention. The method 1800 includes gathering a first portion of network traffic from an external network in a block 1802; selecting a first network packet through a first network filter in a block 1804; storing the first network packet into a first capture file in a block 1806; selecting a second network packet through a second network filter in a block 1808; compressing the first capture file while concurrently storing the second network packet in a second capture file in a block 1810; searching the first compressed capture file and the second capture file using a search value for displaying on a display device in a block 1812.

Thus, it has been discovered that the network traffic system of the present invention furnishes important and heretofore unknown and unavailable solutions, capabilities, and functional aspects for a network traffic system. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing the systems fully compatible with conventional manufacturing methods or processes and technologies.

Another important aspect of the present invention is that it valuably supports and services the historical trend of reducing costs, simplifying manufacturing, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation for a network traffic system comprising:
   gathering a first portion of network traffic from a first network port, the first portion based on a first network filter executing on a first core of a multicore processor, the first portion including state parameters of the network traffic, the first portion stored to a first capture file having a block size of greater than or equal to 1 megabyte (MB);
   compressing the first capture file using a second core of the multicore processor while concurrently storing a second portion of the network traffic in a second capture file, the second portion gathered from a second network port and based on a second network filter;
   gathering a third portion of the network traffic from a third network port, the third portion based on a third network filter;
   replaying time-shifted network traffic from the gathered network traffic in the first capture file, the second capture file, and a third capture file in parallel from the first network port, the second network port, and the third network port respectively;
   concurrent with the replaying, gathering a targeted portion of the time-shifted network traffic from the first network port, the second network port, and the third network port, the targeted portion based on a target network filter executing on a selected core of the multicore processor, the selected core identified by a predefined core affinity value, the targeted portion stored to a target capture file having a block size great than or equal to one megabyte (MB); and
   searching the target capture file using a search value to obtain search results for displaying on a display device.

2. The method as claimed in claim 1 wherein gathering the first portion includes configuring the first network filter to only allow GPRS tunneling protocol packets.

3. The method as claimed in claim 1 wherein gathering the first portion of the network traffic includes gathering the first portion of the network traffic using a network packet broker.

4. The method as claimed in claim 1 wherein storing the gathering a filtered portion of the network traffic includes storing the analysis capture file across a distributed storage system.

5. The method as claimed in claim 1 wherein gathering the first portion of the network traffic includes configuring the first network filter differently than the target network filter.

6. A method of operation for a network traffic system comprising:
   gathering a first portion of network traffic from a first network port coupled to a network having a bandwidth greater than or equal to 20 gigabytes per second, the first portion based on a first network filter executing on a first core of a multicore processor, the first portion including state parameters of the network traffic, and the first portion stored to a first capture file having a block size of greater than or equal to one megabyte (MB);
   compressing the first capture file using a second core of the multicore processor while concurrently storing a second portion of the network traffic in a second capture file, the second portion gathered from a second network port and based on a second network filter;
   gathering a third portion of the network traffic from a third network port, the third portion based on a third network filter;
   replaying time-shifted network traffic from the gathered network traffic in the first capture file, the second capture file, and another capture file in parallel from the first network port, the second network port, and another network port respectively, and the second capture file and the another capture file;
   concurrent with the replaying, gathering a targeted portion of the time-shifted network traffic from the first network port, the second network port, and the another network port, the targeted portion based on a target network filter executing on a selected core of the multicore processor, the selected core identified by a predefined core affinity value, the targeted portion stored to a target capture file having a block size great than or equal to one megabyte (MB); and
   searching the target capture file using a search value to obtain search results for displaying on a display device.

7. The method as claimed in claim 6 wherein gathering the first portion of the network traffic includes configuring the first network filter to only allow GPRS tunneling protocol packets.

8. The method as claimed in claim 6 wherein gathering the first portion of the network traffic includes gathering the first portion of the network traffic using a network packet broker.

9. The method as claimed in claim 6 wherein gathering the first portion of the network traffic includes storing the first capture file across a distributed storage system.

10. The method as claimed in claim 6 wherein gathering the first portion of the network traffic includes configuring the first network filter differently than the target network filter.

11. One or more non-transitory computer-readable media storing instructions that, when executed by one or more computing devices, cause:
   gathering a first portion of network traffic from a first network port, the first portion based on a first network filter executing on a first core of a multicore processor, the first portion including state parameters of the network traffic, the first portion stored to a first capture file having a block size of greater than or equal to 1 megabyte (MB);
   compressing the first capture file using a second core of the multicore processor while concurrently storing a second portion of the network traffic in a second capture file, the second portion gathered from a second network port and based on a second network filter;
   gathering a third portion of the network traffic from a third network port, the third portion based on a third network filter;
   replaying time-shifted network traffic from the gathered network traffic in the first capture file, the second capture file, and a third capture file in parallel from the first network port, the second network port, and the third network port respectively;
   concurrent with the replaying, gathering a targeted portion of the time-shifted network traffic from the first network port, the second network port, and the third network port, the targeted portion based on a target network filter executing on a selected core of the multicore processor, the selected core identified by a predefined core affinity value, the targeted portion stored to a target capture file having a block size great than or equal to one megabyte (MB); and
   searching the target capture file using a search value to obtain search results for displaying on a display device.

12. The one or more non-transitory computer-readable media of claim 11 wherein gathering the first portion includes configuring the first network filter to only allow GPRS tunneling protocol packets.

13. The one or more non-transitory computer-readable media of claim 11 wherein gathering the first portion of the network traffic includes gathering the first portion of the network traffic using a network packet broker.

14. The one or more non-transitory computer-readable media of claim 11 wherein storing the gathering a filtered portion of the network traffic includes storing the analysis capture file across a distributed storage system.

15. The one or more non-transitory computer-readable media of claim 11 wherein gathering the first portion of the network traffic includes configuring the first network filter differently than the target network filter.

16. The one or more non-transitory computer-readable media of claim 11 wherein the first network port is coupled to a network having a bandwidth greater than or equal to 20 gigabytes per second.

17. The one or more non-transitory computer-readable media of claim 16 wherein gathering the first portion of the network traffic includes configuring the first network filter to only allow GPRS tunneling protocol packets.

18. The one or more non-transitory computer-readable media of claim 16 wherein gathering the first portion of the network traffic includes gathering the first portion of the network traffic using a network packet broker.

19. The one or more non-transitory computer-readable media of claim 16 wherein gathering the first portion of the network traffic includes storing the first capture file across a distributed storage system.

20. The one or more non-transitory computer-readable media of claim 16 wherein gathering the first portion of the network traffic includes configuring the first network filter differently than the target network filter.

* * * * *